(12) United States Patent
Tsai et al.

(10) Patent No.: US 8,736,980 B2
(45) Date of Patent: May 27, 2014

(54) IMAGING LENS ASSEMBLY

(71) Applicant: Largan Precision Co., Ltd., Taichung (TW)

(72) Inventors: Tsung-Han Tsai, Taichung (TW); Ming-Ta Chou, Taichung (TW)

(73) Assignee: Largan Precision Co., Ltd., Taichung (TW)

(*) Notice: Subject to any disclaimer, the term of this patent is extended or adjusted under 35 U.S.C. 154(b) by 58 days.

(21) Appl. No.: 13/682,748

(22) Filed: Nov. 21, 2012

(65) Prior Publication Data

US 2014/0063622 A1    Mar. 6, 2014

(30) Foreign Application Priority Data

Aug. 30, 2012  (TW) .............................. 101131587 A

(51) Int. Cl.
*G02B 13/18* (2006.01)

(52) U.S. Cl.
CPC ...................................... *G02B 13/18* (2013.01)
USPC ........................................................ 359/714

(58) Field of Classification Search
CPC ........ G02B 13/18; G02B 9/60; G02B 13/002; G02B 13/0045
USPC .................................................... 359/714, 770
See application file for complete search history.

(56) References Cited

U.S. PATENT DOCUMENTS 7,697,220 B2 *   4/2010   Iyama ........................... 359/753

\* cited by examiner

*Primary Examiner* — Joseph P Martinez
(74) *Attorney, Agent, or Firm* — CKC & Partners Co., Ltd.

(57) ABSTRACT

An imaging lens assembly includes, in order from an object side to an image side, a first lens element, a second lens element, a third lens element, a fourth lens element and a fifth lens element. The first lens element with negative refractive power has an object-side surface being concave at a paraxial region thereof, wherein the surfaces thereof are aspheric. The second lens element has refractive power. The third lens element has positive refractive power. The fourth lens element has negative refractive power. The fifth lens element with positive refractive power has an object-side surface being convex at a paraxial region thereof and an image-side surface being concave at a paraxial region thereof, wherein the object-side surface thereof changes from convex at the paraxial region thereof to concave at a peripheral region thereof, and the surfaces thereof are aspheric.

28 Claims, 21 Drawing Sheets

IMAGING LENS ASSEMBLY

RELATED APPLICATIONS

The application claims priority to Taiwan Application Serial Number 101131587, filed Aug. 30, 2012, which is herein incorporated by reference.

BACKGROUND

1. Technical Field

The present invention relates to an imaging lens assembly. More particularly, the present invention relates to a compact imaging lens assembly applicable to electronic products.

2. Description of Related Art

In recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a structure of four-element lens such as the one disclosed in U.S. Pat. No. 8,179,470. Due to the popularity of mobile products with high-end specifications, such as smart phones and PDAs (Personal Digital Assistants), the requirements for high resolution and image quality of modern compact optical lens systems has been increasing significantly. However, the conventional four-element lens structure cannot satisfy these requirements of the compact optical lens system.

Although other conventional optical lens systems with five-element lens structure such as the ones disclosed in U.S. Pat. No. 8,000,031, however, the object-side surface of the first lens element of the optical lens system is not concave which can enlarge a field of view. Thus, the field of view of the optical lens system would be restricted, and the distortion is more pronounced with the current lens configuration dictated by the surface shape, so that the image quality suffers substantially.

SUMMARY

According to one aspect of the present disclosure, an imaging lens assembly includes, in order from an object side to an image side, a first lens element, a second lens element, a third lens element, a fourth lens element and a fifth lens element. The first lens element with negative refractive power has an object-side surface being concave at a paraxial region thereof, wherein the object-side surface and an image-side surface of the first lens element are aspheric. The second lens element has refractive power. The third lens element has positive refractive power. The fourth lens element has negative refractive power. The fifth lens element with positive refractive power has an object-side surface being convex at a paraxial region thereof and an image-side surface being concave at a paraxial region thereof, wherein the object-side surface of the fifth lens element changes from convex at the paraxial region thereof to concave at a peripheral region thereof, and the object-side surface and the image-side surface of the fifth lens element are aspheric. When a minimum distance between an optical axis and a non-axial critical point on the object-side surface of the fifth lens element is Yc51, and a distance in parallel with the optical axis from the non-axial critical point on the object-side surface of the fifth lens element to an axial vertex on the object-side surface of the fifth lens element is SAGc51, SAGc51/Yc51 is a tangent value of an angle $\alpha$, the following relationship is satisfied:

$$0.10 < \tan \alpha < 0.60.$$

According to another aspect of the present disclosure, an imaging lens assembly includes, in order from an object side to an image side, a first lens element, a second lens element, a third lens element, a fourth lens element and a fifth lens element. The first lens element with negative refractive power has an object-side surface being concave at a paraxial region thereof, wherein the object-side surface and an image-side surface of first lens element are aspheric. The second lens element has refractive power. The third lens element has positive refractive power. The fourth lens element has negative refractive power. The fifth lens element with positive refractive power has an object-side surface being convex at a paraxial region thereof and an image-side being concave at a paraxial region thereof, wherein the object-side surface of the fifth lens element changes from convex at the paraxial region thereof to concave at a peripheral region thereof, and the object-side surface and the image-side surface of the fifth lens element are aspheric. When an effective radius of the object-side surface of the fifth lens element is Y51, and an effective radius of the object-side surface of the first lens element is Y11, the following relationship is satisfied:

$$0.7 < |Y51/Y11| < 1.2.$$

According to yet another aspect of the present disclosure, an imaging lens assembly includes, in order from an object side to an image side, a first lens element, a second lens element, a third lens element, a fourth lens element and a fifth lens element. The first lens element with negative refractive power has an object-side surface being concave at a paraxial region thereof, wherein the object-side surface of the first lens element changes from concave at the paraxial region thereof to convex at a peripheral region thereof, and the object-side surface and an image-side surface of the first lens element are aspheric. The second lens element has refractive power. The third lens element has positive refractive power. The fourth lens element has negative refractive power. The fifth lens element with positive refractive power has an object-side surface being convex at a paraxial region thereof and an image-side surface being concave at a paraxial region thereof, wherein the object-side surface of the fifth lens element changes from convex at the paraxial region thereof to concave at a peripheral region thereof, and the object-side surface and the image-side surface of the fifth lens element are aspheric. When a curvature radius of the object-side surface of the first lens element is R1, and a focal length of the first lens element is f1, the following relationship is satisfied:

$$0 < R1/f1 < 2.0.$$

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
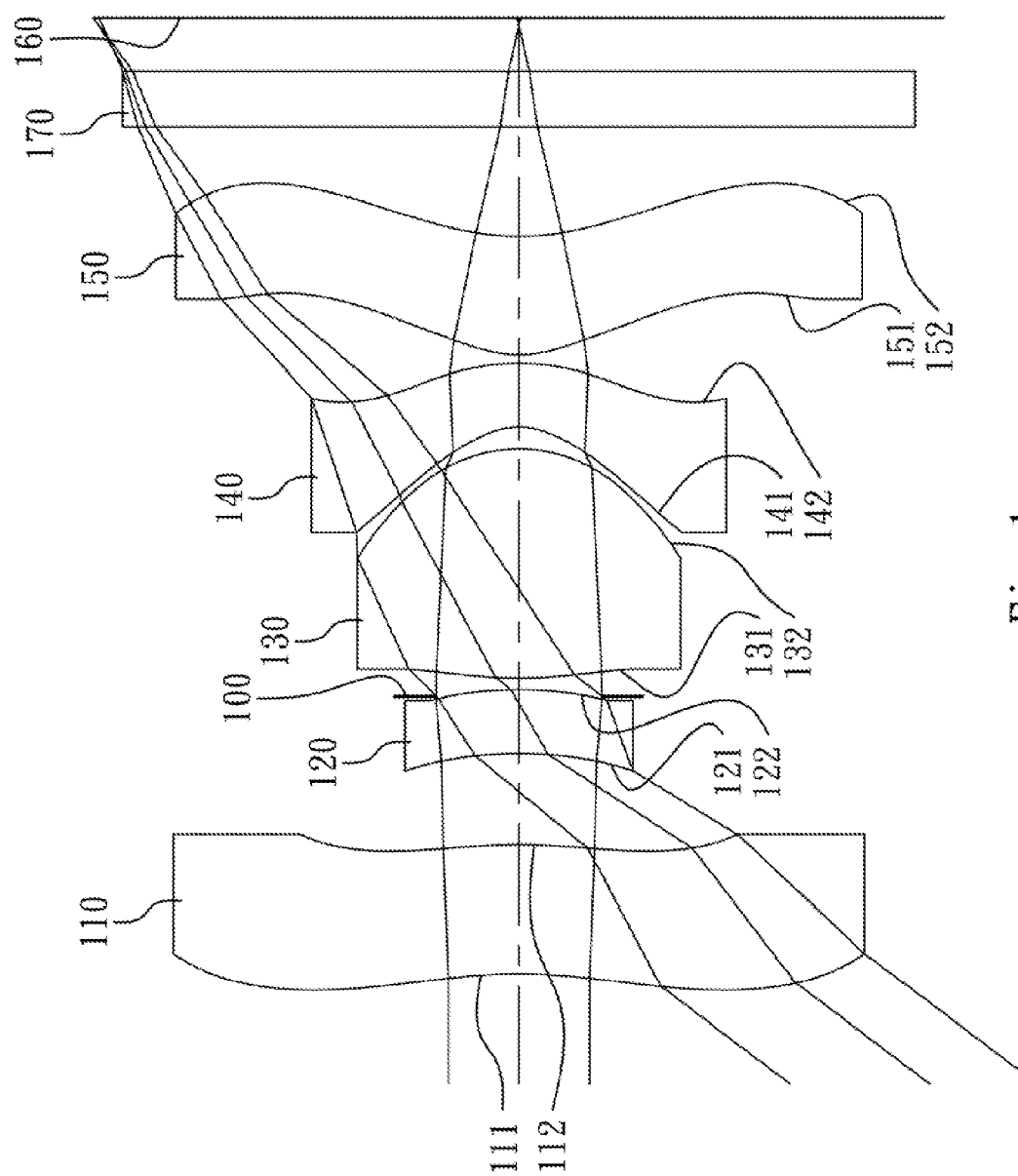
FIG. 1 is a schematic view of an imaging lens assembly according to the 1st embodiment of the present disclosure.

An imaging lens assembly includes, in order from an object side to an image side, a first lens element, a second lens element, a third lens element, a fourth lens element and a fifth lens element.

The first lens element with negative refractive power has an object-side surface being concave at a paraxial region thereof, so that the field of view of the imaging lens assembly can be enlarged. Furthermore, the object-side surface of the first lens element changes from concave at the paraxial region thereof to convex at a peripheral region thereof, so that the aberration of the off-axis field can be corrected.

The third lens element with positive refractive power can have an image-side surface being convex at a paraxial region thereof for reducing the total track length of the imaging lens assembly by providing the necessary positive refractive power.

The fourth lens element with negative refractive power can have an object-side surface being concave at a paraxial region thereof and an image-side surface being convex at a paraxial region thereof. Therefore, the astigmatism and other aberrations of the imaging lens assembly can be corrected.

The fifth lens element with positive refractive power has an object-side surface being convex at a paraxial region thereof and an image-side surface being concave at a paraxial region thereof, so that the distribution of the positive refractive power can be balanced and the high order aberration of the imaging lens assembly can be corrected. Furthermore, the object-side surface of the fifth lens element changes from convex at the paraxial region thereof to concave at a peripheral region thereof, thus the angle at which the incident light projects onto an image sensor from the off-axis field can be effectively reduced, and the aberration of the off-axis field can be further corrected.

When a minimum distance between an optical axis and a non-axial critical point on the object-side surface of the fifth lens element is Yc51, and a distance in parallel with the optical axis from the non-axial critical point on the object-side surface of the fifth lens element to an axial vertex on the object-side surface of the fifth lens element is SAGc51, SAGc51/Yc51 is a tangent value of an angle α, the following relationship is satisfied:

$$0.10 < \tan\alpha < 0.60.$$

Therefore, the aberration of the central field and the off-axis field can be corrected for enhancing the image quality.

SAGc51 and Yc51 can further satisfy the following relationship, wherein $\tan\alpha = SAGc51/Yc51$:

$$0.15 < \tan\alpha < 0.40.$$

When a curvature radius of an object-side surface of the third lens element is R5, and a curvature radius of the image-side surface of the third lens element is R6, the following relationship is satisfied:

$$0 < |R6/R5| < 0.7.$$

Thus, the positive refractive power of the third lens element is proper by adjusting the curvature of the surfaces of the third lens element, so that the total track length of the imaging lens assembly can be reduced.

When a curvature radius of the object-side surface of the first lens element is R1, and a focal length of the first lens element is f1, the following relationship is satisfied:

$$0 < R1/f1 < 2.0.$$

Therefore, the field of view of the imaging lens assembly can be enlarged by adjusting the curvature of the object-side surface of the first lens element.

When an effective radius of the object-side surface of the fifth lens element is Y51, and an effective radius of the object-side surface of the first lens element is Y11, the following relationship is satisfied:

$$0.7 < |Y51/Y11| < 1.2.$$

Therefore, the aberration of the central field and off-axis field can be corrected while the first lens element has a larger effective radius, and the field of view can be enlarged and the optical distortion of the imaging lens assembly can be reduced.

When a focal length of the imaging lens assembly is f, and a focal length of the third lens element is f3, the following relationship is satisfied:

$$0.80 < f/f3 < 1.70.$$

Thus, by properly adjusting the positive refractive power of the third lens element, the total track length of the imaging lens assembly can be reduced and the spherical aberration thereof can be corrected.

When the distance between the optical axis and the non-axial critical point on the object-side surface of the fifth lens element is Yc51, and the effective radius of the object-side surface of the fifth lens element is Y51, the following relationship is satisfied:

$$0.7 < |Yc51/Y51| < 0.95.$$

Therefore, the aberration of the central field and off-axis field can be corrected.

When an Abbe number of the third lens element is V3, and an Abbe number of the fourth lens element is V4, the following relationship is satisfied:

$$26.0 < V3 - V4 < 52.0.$$

Therefore, the chromatic aberration of the imaging lens assembly can be corrected.

When a maximal field of view of the imaging lens assembly is FOV, the following relationship is satisfied:

$$80 \text{ degrees} < FOV < 120 \text{ degrees}.$$

Therefore, the imaging lens assembly can have a larger field of view for obtaining wider photo capturing range.

When a curvature radius of the image-side surface of the third lens element is R6, and a curvature radius of the object-side surface of the fourth lens element is R7, the following relationship is satisfied:

$$0.2 < R7/R6 < 0.8.$$

Therefore, the fourth lens element can correct the aberration generated from the third lens element, thus the resolving power of the imaging lens assembly can be enhanced.

When an axial distance between the object-side surface of the first lens element and the image-side surface of the fifth lens element is Td, the following relationship is satisfied:

$$2.1 \text{ mm} < Td < 3.6 \text{ mm}.$$

Therefore, the compact size of the imaging lens assembly can be maintained.

According to the imaging lens assembly of the present disclosure, the lens elements thereof can be made of glass or plastic material. When the lens elements are made of glass material, the distribution of the refractive power of the imaging lens assembly may be more flexible to design. When the lens elements are made of plastic material, the manufacturing cost can be effectively reduced. Furthermore, surfaces of each lens element can be aspheric, so that it is easier to make the surfaces into non-spherical shapes. As a result, more controllable variables are obtained, and the aberration is reduced, as well as the number of required lens elements can be reduced while constructing an optical system. Therefore, the total track length of the imaging lens assembly can also be reduced.

According to the imaging lens assembly of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the paraxial region of the surface is convex; and when the lens element has a concave surface, it indicates that the paraxial region of the surface is concave.

According to the imaging lens assembly of the present disclosure, a critical point is a non-axial point of the lens surface where its tangent is perpendicular to the optical axis.

According to the imaging lens assembly of the present disclosure, the imaging lens assembly can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop which can be disposed between an object and the first lens element provides a longer distance from an exit pupil of the system to an image plane and thereby the generated telecentric effect improves the image-sensing efficiency of an image sensor. A middle stop which can be disposed between the first lens element and the image plane is favorable for enlarging the field of view of the system and thereby provides a wider field of view for the same.

According to the above description of the present disclosure, the following 1st-10th specific embodiments are provided for further explanation.

1st Embodiment

Figure 2:
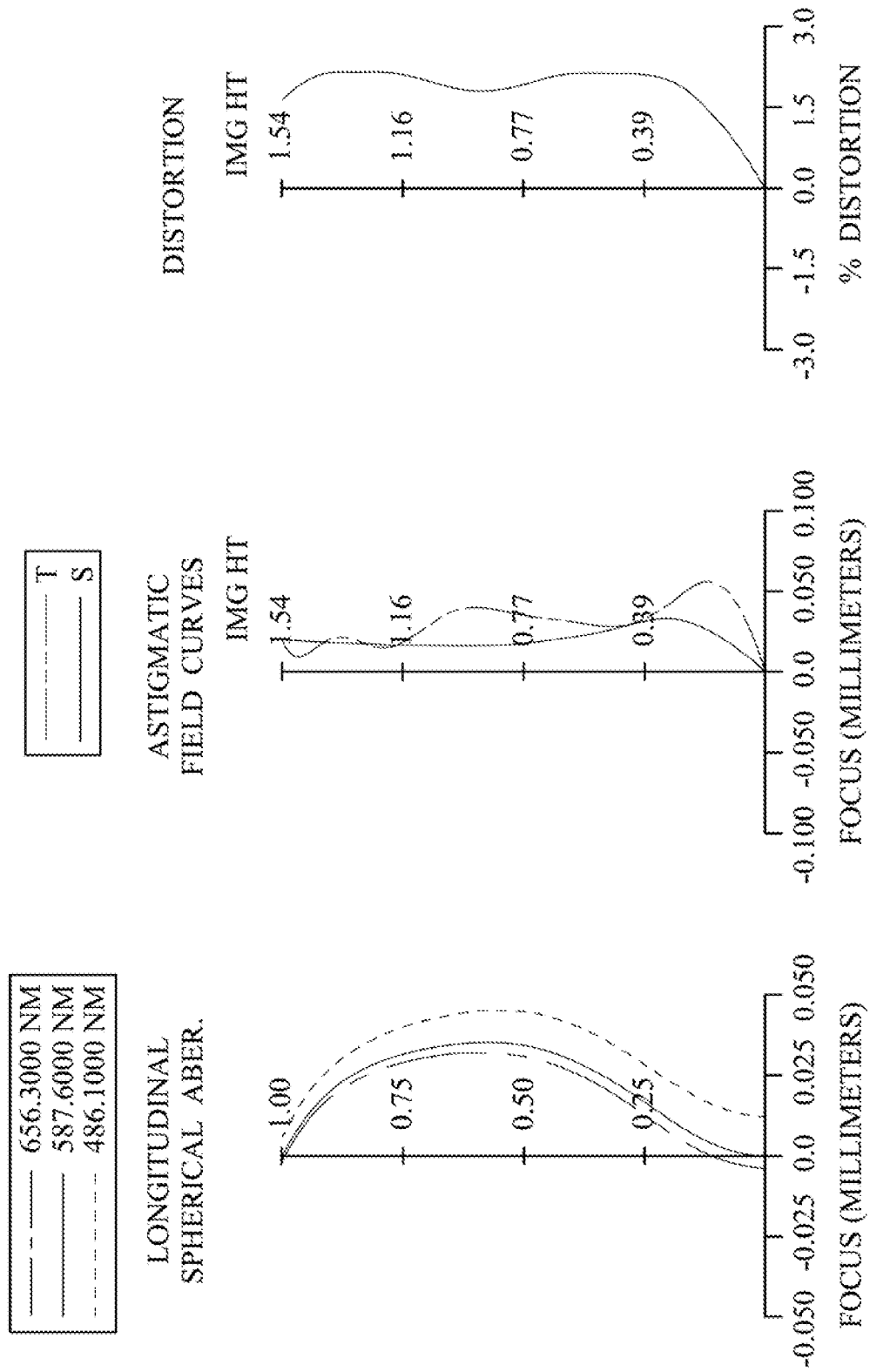
FIG. 2 shows spherical aberration curves, astigmatic field curves and a distortion curve of the imaging lens assembly according to the 1st embodiment.

FIG. 1 is a schematic view of an imaging lens assembly according to the 1st embodiment of the present disclosure. FIG. 2 shows spherical aberration curves, astigmatic field curves and a distortion curve of the imaging lens assembly according to the 1st embodiment. In FIG. 1, the imaging lens assembly includes, in order from an object side to an image side, a first lens element 110, a second lens element 120, an aperture stop 100, a third lens element 130, a fourth lens element 140, a fifth lens element 150, an IR-cut filter 170 and an image plane 160.

The first lens element 110 with negative refractive power has an object-side surface 111 being concave at a paraxial region thereof and an image-side surface 112 being convex at a paraxial region thereof, wherein the object-side surface 111 of the first lens element 110 changes from concave at the paraxial region thereof to convex at a peripheral region thereof. The first lens element 110 is made of plastic material and has the object-side surface 111 and the image-side surface 112 being both aspheric.

The second lens element 120 with negative refractive power has a concave object-side surface 121 and a convex image-side surface 122. The second lens element 120 is made of plastic material and has the object-side surface 121 and the image-side surface 122 being both aspheric.

The third lens element 130 with positive refractive power has an object-side surface 131 being convex at a paraxial region thereof and an image-side surface 132 being convex at a paraxial region thereof. The third lens element 130 is made of plastic material and has the object-side surface 131 and the image-side surface 132 being both aspheric.

The fourth lens element 140 with negative refractive power has an object-side surface 141 being concave at a paraxial region thereof and an image-side surface 142 being convex at a paraxial region thereof. The fourth lens element 140 is made of plastic material and has the object-side surface 141 and the image-side surface 142 being both aspheric.

The fifth lens element 150 with positive refractive power has an object-side surface 151 being convex at a paraxial region thereof and an image-side surface 152 being concave at a paraxial region thereof, wherein the object-side surface 151 of the fifth lens element 150 changes from convex at the paraxial region thereof to concave at a peripheral region thereof. The fifth lens element 150 is made of plastic material and has the object-side surface 151 and the image-side surface 152 being both aspheric.

The IR-cut filter 170 is made of glass material which located between the fifth lens element 150 and the image plane 160, and will not affect the focal length of the imaging lens assembly.

The equation of the aspheric surface profiles of the aforementioned lens elements of the imaging lens assembly is expressed as follows:

$$X(Y) = (Y^2/R)/(1 + sqrt(1-(1+k) \times (Y/R)^2)) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the imaging lens assembly according to the 1st embodiment, when a focal length of the imaging lens assembly is f, an f-number of the imaging lens assembly is Fno, and half of the maximal field of view of the imaging lens assembly is HFOV, these parameters have the following values:

f=1.13 mm;
Fno=2.20; and
HFOV=53.0 degrees.

In the imaging lens assembly according to the 1st embodiment, when an Abbe number of the third lens element 130 is V3, and an Abbe number of the fourth lens element 140 is V4, the following relationship is satisfied:

$V3-V4=32.6.$

In the imaging lens assembly according to the 1st embodiment, when an axial distance between the object-side surface 111 of the first lens element 110 and the image-side surface 152 of the fifth lens element 150 is Td, the following relationship is satisfied:

$Td=2.680$ mm.

In the imaging lens assembly according to the 1st embodiment, when a curvature radius of the object-side surface 131 of the third lens element 130 is R5, and a curvature radius of the image-side surface 132 of the third lens element 130 is R6, the following relationship is satisfied:

$|R6/R5|=0.33.$

In the imaging lens assembly according to the 1st embodiment, when the curvature radius of the image-side surface 132 of the third lens element 130 is R6, a curvature radius of the object-side surface 141 of the fourth lens element 140 is R7, and a curvature radius of the image-side surface 142 of the fourth lens element 140 is R8, the following relationships are satisfied:

$R7/R6=0.49;$ and $(R7-R8)/(R7+R8)=-0.57.$

In the imaging lens assembly according to the 1st embodiment, when a curvature radius of the object-side surface 111 of the first lens element 110 is R1, and a focal length of the first lens element 110 is f1, the following relationship is satisfied:

$R1/f1=0.07.$

In the imaging lens assembly according to the 1st embodiment, when the focal length of the imaging lens assembly is f, and a focal length of the third lens element 130 is f3, the following relationship is satisfied:

$f/f3=1.43.$

In the imaging lens assembly according to the 1st embodiment, when an effective radius of the object-side surface 151 of the fifth lens element 150 is Y51, and an effective radius of the object-side surface 111 of the first lens element 110 is Y11, the following relationship is satisfied:

$|Y51/Y11|=0.86.$

Figure 21:
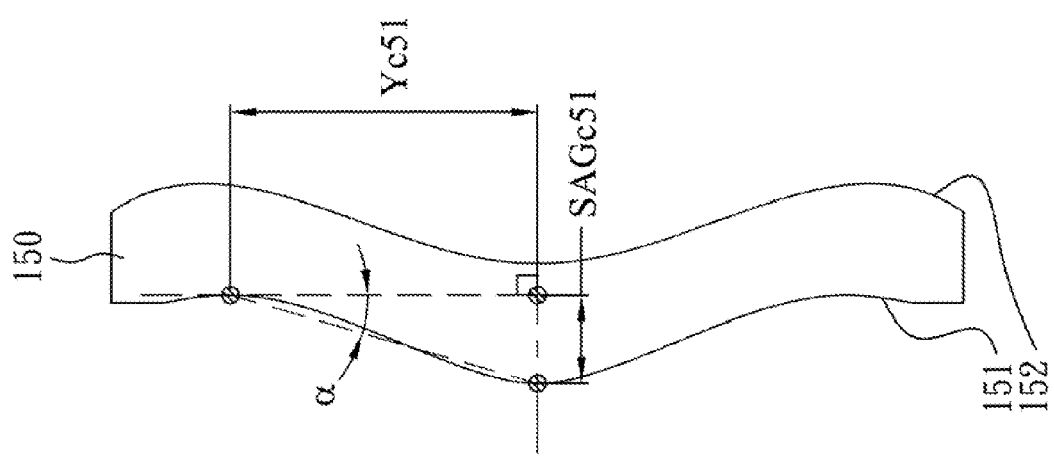
FIG. 21 shows parameters Yc51 and SAGc51 of the fifth lens element of the imaging lens assembly shown in FIG. 1.

FIG. 21 shows parameters Yc51 and SAGc51 of the fifth lens element 150 of the imaging lens assembly in FIG. 1. In FIG. 21, when a minimum distance between an optical axis and a non-axial critical point on the object-side surface 151 of the fifth lens element 150 is Yc51, and a distance in parallel with the optical axis from the non-axial critical point on the object-side surface 151 of the fifth lens element 150 to an axial vertex on the object-side surface 151 of the fifth lens element 150 is SAGc51, the effective radius of the object-side surface 151 of the fifth lens element 150 is Y51, SAGc51/Yc51 is a tangent value of an angle α, and the following relationship is satisfied:

$|Yc51/Y51|=0.79;$ and $\tan \alpha = 0.266.$

In the imaging lens assembly according to the 1st embodiment, when a maximal field of view of the imaging lens assembly is FOV, the following relationship is satisfied:

$FOV=106$ degrees.

The detailed optical data of the 1st embodiment are shown in Table 1 and the aspheric surface data are shown in Table 2 below.

TABLE 1

1st Embodiment
f = 1.13 mm, Fno = 2.20, HFOV = 53.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −1.798 | (ASP) | 0.469 | Plastic | 1.544 | 55.9 | −24.67 |
| 2 | | −2.266 | (ASP) | 0.333 | | | | |
| 3 | Lens 2 | −1.408 | (ASP) | 0.230 | Plastic | 1.544 | 55.9 | −75.16 |
| 4 | | −1.542 | (ASP) | −0.025 | | | | |

TABLE 1-continued

1st Embodiment
f = 1.13 mm, Fno = 2.20, HFOV = 53.0 deg.

| Surface # | | Curvature Radius | | Thickness | Material | Index | Abbe # | Focal length |
|---|---|---|---|---|---|---|---|---|
| 5 | Ape. Stop | Plano | | 0.069 | | | | |
| 6 | Lens 3 | 1.461 | (ASP) | 0.832 | Plastic | 1.544 | 55.9 | 0.79 |
| 7 | | −0.488 | (ASP) | 0.081 | | | | |
| 8 | Lens 4 | −0.240 | (ASP) | 0.230 | Plastic | 1.640 | 23.3 | −0.60 |
| 9 | | −0.882 | (ASP) | 0.030 | | | | |
| 10 | Lens 5 | 0.383 | (ASP) | 0.431 | Plastic | 1.535 | 56.3 | 0.96 |
| 11 | | 0.931 | (ASP) | 0.400 | | | | |
| 12 | IR-cut filter | Plano | | 0.200 | Glass | 1.517 | 64.2 | — |
| 13 | | Plano | | 0.195 | | | | |
| 14 | Image | Plano | | — | | | | |

Note:
Reference wavelength (d-line) is 587.6 nm.

TABLE 2

Aspheric Coefficients

| | Surface # | | | | |
|---|---|---|---|---|---|
| | 1 | 2 | 3 | 4 | 6 |
| k = | −2.0000E+01 | −1.9995E+01 | −1.2785E+01 | −1.5122E+01 | −9.7544E−01 |
| A4 = | 1.6439E−01 | 5.3683E−01 | −2.8778E−01 | −1.4679E+00 | −1.2094E+00 |
| A6 = | −5.7803E−02 | −7.8609E−01 | −2.6437E+00 | 5.0783E+00 | 8.8059E+00 |
| A8 = | −1.5361E−02 | 1.1677E+00 | 2.2330E+01 | −1.5341E+01 | −1.1373E+02 |
| A10 = | 5.0242E−02 | −9.7863E−01 | −1.0352E+02 | −6.0927E+01 | 8.3502E+02 |
| A12 = | −2.8552E−02 | 7.9237E−01 | 1.8703E+02 | 1.9727E+02 | −3.3211E+03 |
| A14 = | 5.9661E−03 | −3.9169E−01 | 1.8090E−06 | −1.5917E−08 | 5.7411E+03 |

| | Surface # | | | | |
|---|---|---|---|---|---|
| | 7 | 8 | 9 | 10 | 11 |
| k = | −8.7942E+00 | −3.5896E+00 | −8.4392E−02 | −5.9321E+00 | −7.3562E−01 |
| A4 = | −5.0096E+00 | −5.2259E+00 | −1.2107E+00 | 3.5148E−02 | −4.2730E−01 |
| A6 = | 2.1139E+01 | 3.9245E+01 | 1.4327E+01 | −9.7574E−01 | −4.9557E−01 |
| A8 = | −6.8239E+01 | −1.6147E+02 | −4.5364E+01 | 2.2575E+00 | 1.7188E+00 |
| A10 = | 1.3663E+02 | 3.7153E+02 | 8.0697E+01 | −3.1115E+00 | −2.3459E+00 |
| A12 = | −1.5191E+02 | −4.1710E+02 | −7.6875E+01 | 2.4664E+00 | 1.7017E+00 |
| A14 = | 7.4917E+01 | 1.5208E+02 | 3.0362E+01 | −9.9638E−01 | −6.4944E−01 |
| A16 = | | | | 1.5920E−01 | 1.0269E−01 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
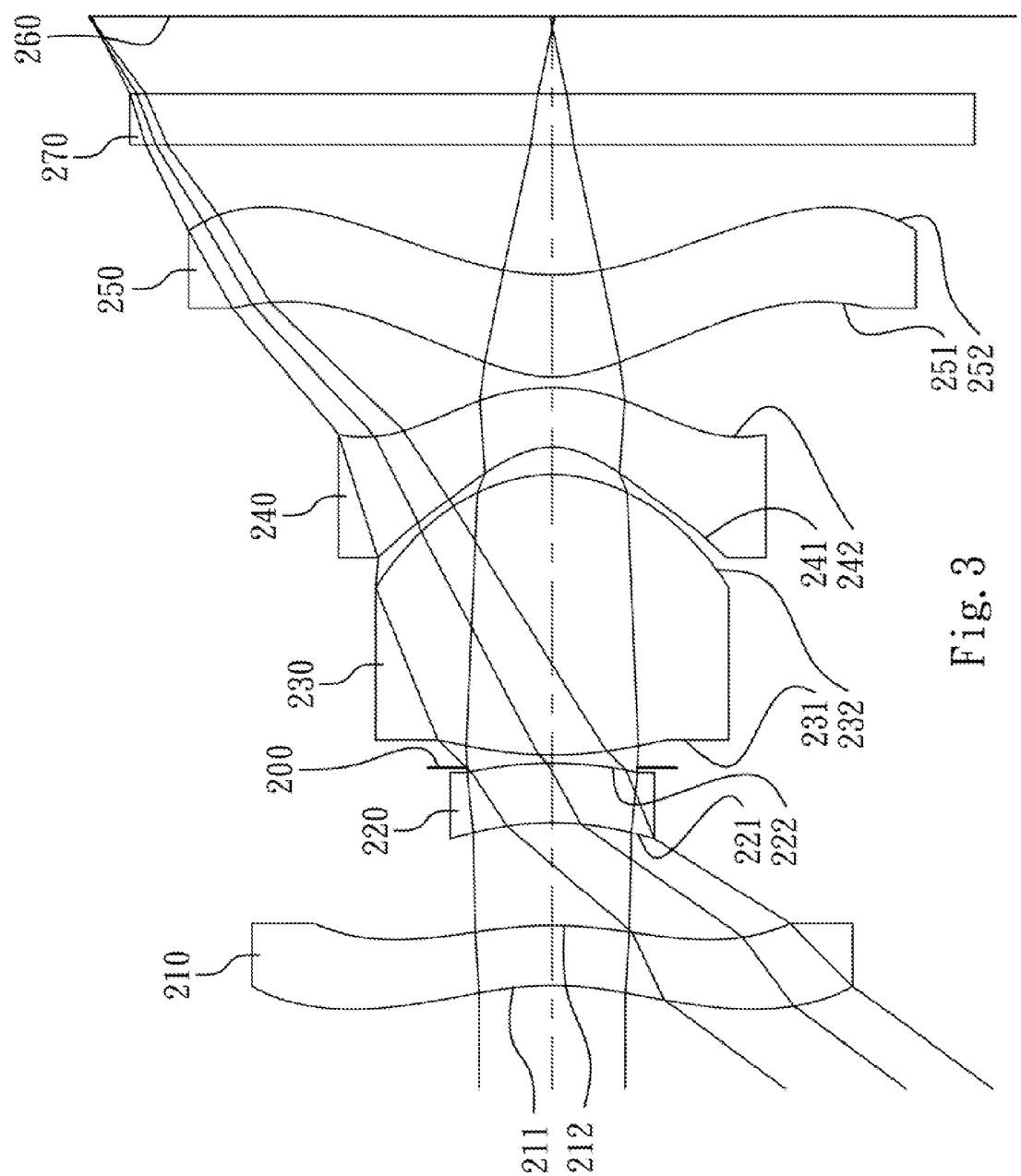
FIG. 3 is a schematic view of an imaging lens assembly according to the 2nd embodiment of the present disclosure.
Figure 4:
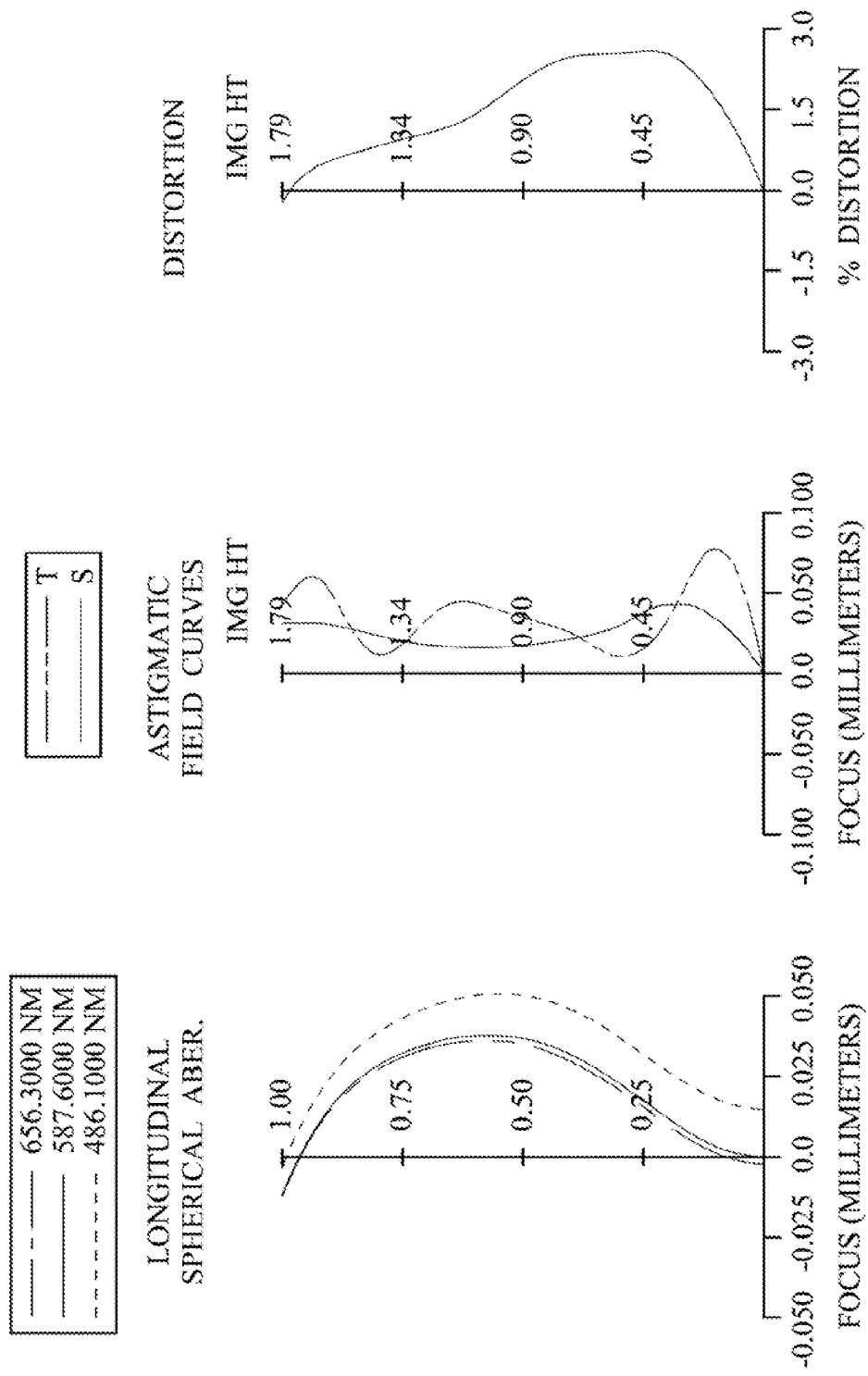
FIG. 4 shows spherical aberration curves, astigmatic field curves and a distortion curve of the imaging lens assembly according to the 2nd embodiment.

FIG. 3 is a schematic view of an imaging lens assembly according to the 2nd embodiment of the present disclosure. FIG. 4 shows spherical aberration curves, astigmatic field curves and a distortion curve of the imaging lens assembly according to the 2nd embodiment. In FIG. 3, the imaging lens assembly includes, in order from an object side to an image side, a first lens element 210, a second lens element 220, an aperture stop 200, a third lens element 230, a fourth lens element 240, a fifth lens element 250, an IR-cut filter 270 and an image plane 260.

The first lens element 210 with negative refractive power has an object-side surface 211 being concave at a paraxial region thereof and an image-side surface 212 being convex at a paraxial region thereof, wherein the object-side surface 211 of the first lens element 210 changes from concave at the paraxial region thereof to convex at a peripheral region thereof. The first lens element 210 is made of plastic material and has the object-side surface 211 and the image-side surface 212 being both aspheric.

The second lens element 220 with negative refractive power has a concave object-side surface 221 and a convex image-side surface 222. The second lens element 220 is made of plastic material and has the object-side surface 221 and the image-side surface 222 being both aspheric.

The third lens element 230 with positive refractive power has an object-side surface 231 being convex at a paraxial region thereof and an image-side surface 232 being convex at a paraxial region thereof. The third lens element 230 is made of plastic material and has the object-side surface 231 and the image-side surface 232 being both aspheric.

The fourth lens element 240 with negative refractive power has an object-side surface 241 being concave at a paraxial region thereof and an image-side surface 242 being convex at a paraxial region thereof. The fourth lens element 240 is made of plastic material and has the object-side surface 241 and the image-side surface 242 being both aspheric.

The fifth lens element 250 with positive refractive power has an object-side surface 251 being convex at a paraxial region thereof and an image-side surface 252 being concave at a paraxial region thereof, wherein the object-side surface 251 of the fifth lens element 250 changes from convex at the paraxial region thereof to concave at a peripheral region thereof. The fifth lens element 250 is made of plastic material and has the object-side surface 251 and the image-side surface 252 being both aspheric.

The IR-cut filter 270 is made of glass material which located between the fifth lens element 250 and the image plane 260, and will not affect the focal length of the imaging lens assembly.

The detailed optical data of the 2nd embodiment are shown in Table 3 and the aspheric surface data are shown in Table 4 below.

TABLE 3

2nd Embodiment f = 1.30 mm, Fno = 2.30, HFOV = 53.8 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −1.164 | (ASP) | 0.230 | Plastic | 1.544 | 55.9 | −15.04 |
| 2 | | −1.452 | (ASP) | 0.399 | | | | |
| 3 | Lens 2 | −1.130 | (ASP) | 0.230 | Plastic | 1.544 | 55.9 | −9.60 |
| 4 | | −1.545 | (ASP) | −0.018 | | | | |
| 5 | Ape. Stop | Plano | | 0.048 | | | | |
| 6 | Lens 3 | 1.362 | (ASP) | 1.087 | Plastic | 1.530 | 55.8 | 0.96 |
| 7 | | −0.589 | (ASP) | 0.106 | | | | |
| 8 | Lens 4 | −0.276 | (ASP) | 0.230 | Plastic | 1.650 | 21.4 | −0.80 |
| 9 | | −0.774 | (ASP) | 0.041 | | | | |
| 10 | Lens 5 | 0.446 | (ASP) | 0.396 | Plastic | 1.530 | 55.8 | 1.22 |
| 11 | | 1.005 | (ASP) | 0.500 | | | | |
| 12 | IR-cut filter | Plano | | 0.200 | Glass | 1.517 | 64.2 | — |
| 13 | | Plano | | 0.297 | | | | |
| 14 | Image | Plano | | — | | | | |

Note:

Reference wavelength (d-line) is 587.6 nm.

TABLE 4

Aspheric Coefficients

| | Surface # | | | | |
|---|---|---|---|---|---|
| | 1 | 2 | 3 | 4 | 6 |
| k = | −1.0000E+01 | −1.0000E+01 | −8.9146E+00 | −7.0548E+00 | 1.5941E+00 |
| A4 = | 2.3538E−01 | 4.3486E−01 | −1.4814E−01 | −3.2181E−01 | 5.7583E−01 |
| A6 = | −1.1488E−01 | −3.9846E−01 | −8.1089E−01 | 1.4739E+00 | 4.2795E+00 |
| A8 = | 3.6613E−02 | 3.8369E−01 | 7.9035E+00 | 5.5834E−02 | 3.9601E+01 |
| A10 = | 1.1573E−02 | −2.4863E−01 | −2.8510E+01 | −3.9372E+01 | 2.1518E+02 |
| A12 = | −1.0388E−02 | 1.4308E−01 | 3.5819E+01 | 3.7781E+01 | 6.3606E+02 |
| A14 = | 2.3276E−03 | −5.8580E−02 | 2.7375E−07 | −1.4201E−09 | 8.1414E+02 |

| | Surface # | | | | |
|---|---|---|---|---|---|
| | 7 | 8 | 9 | 10 | 11 |
| k = | −5.4067E+00 | −2.8394E+00 | −3.8511E−01 | −5.7055E+00 | −7.6122E−01 |
| A4 = | −2.4340E+00 | −2.6676E+00 | −5.1747E−01 | 6.4097E−02 | −2.7473E−01 |
| A6 = | 9.1985E+00 | 1.8232E+01 | 6.9434E+00 | −4.8042E−01 | −2.3784E−01 |
| A8 = | −2.4693E+01 | −5.7253E+01 | −1.6028E+01 | 7.8802E−01 | 5.9680E−01 |
| A10 = | 3.4747E+01 | 9.4260E+01 | 2.0703E+01 | −8.0552E−01 | −6.0584E−01 |
| A12 = | −2.7504E+01 | −8.2956E+01 | −1.4643E+01 | 4.7177E−01 | 3.2662E−01 |
| A14 = | 1.2436E+01 | 3.1473E+01 | 4.5566E+00 | −1.4138E−01 | −9.2060E−02 |
| A16 = | | | | 1.6968E−02 | 1.0661E−02 |

In the imaging lens assembly according to the 2nd embodiment, the definitions of f, Fno, HFOV, V3, V4, Td, R1, R5, R6, R7, R8, f1, f3, Y51, Y11, Yc51, tan α and FOV are the same as those stated in the 1st embodiment with corresponding values for the 2nd embodiment. Moreover, these parameters can be calculated from Table 3 and Table 4 as the following values and satisfy the following relationships:

| f (mm) | 1.30 | (R7 − R8)/(R7 + R8) | −0.47 |
|---|---|---|---|
| Fno | 2.30 | R1/f1 | 0.08 |
| HFOV (deg.) | 53.8 | f/f3 | 1.35 |
| V3 − V4 | 34.4 | \|Y51/Y11\| | 1.06 |
| Td (mm) | 2.749 | \|Yc51/Y51\| | 0.83 |
| \|R6/R5\| | 0.43 | tan α | 0.284 |
| R7/R6 | 0.47 | FOV(deg.) | 107.6 |

3rd Embodiment

Figure 5:
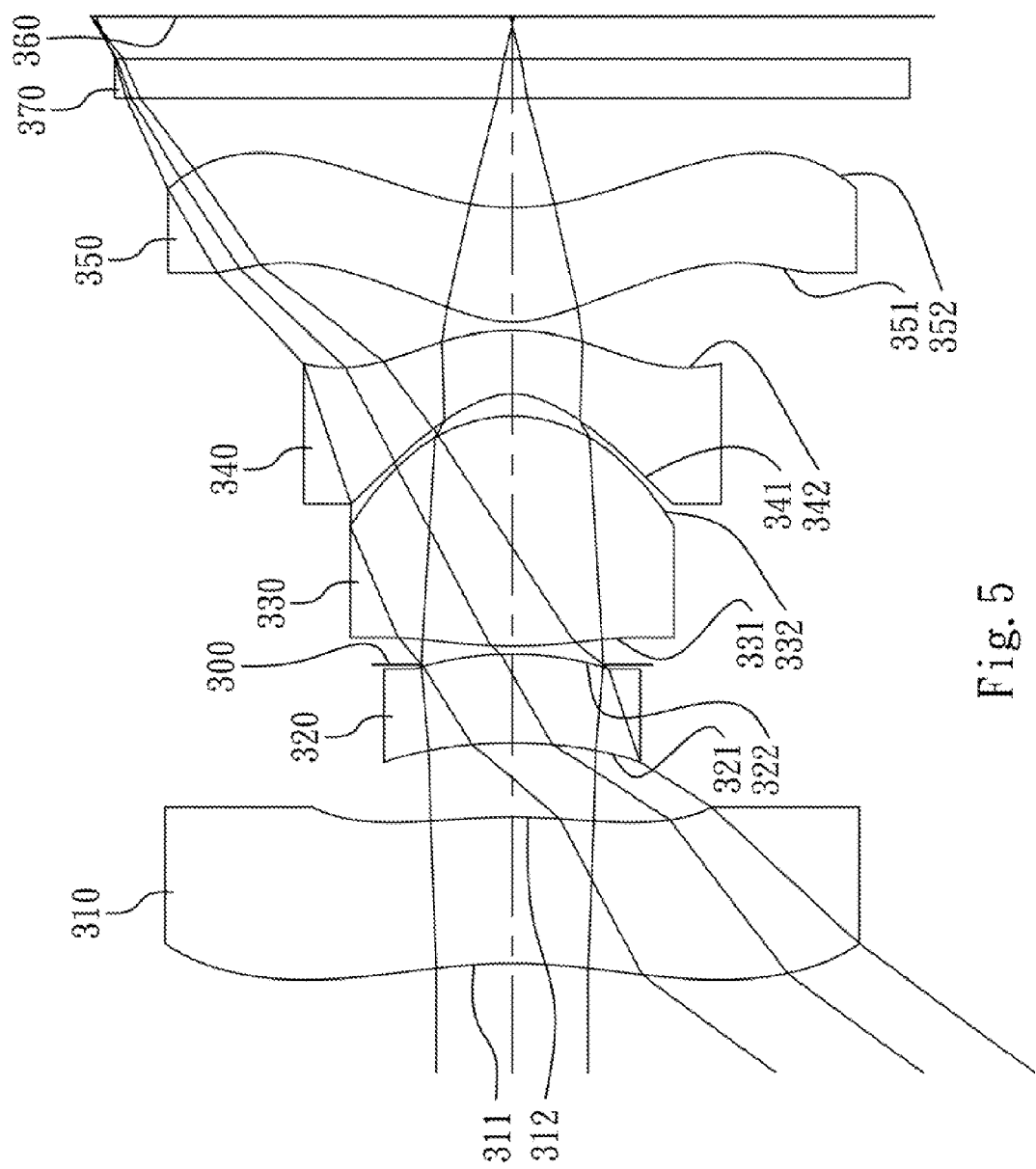
FIG. 5 is a schematic view of an imaging lens assembly according to the 3rd embodiment of the present disclosure.
Figure 6:
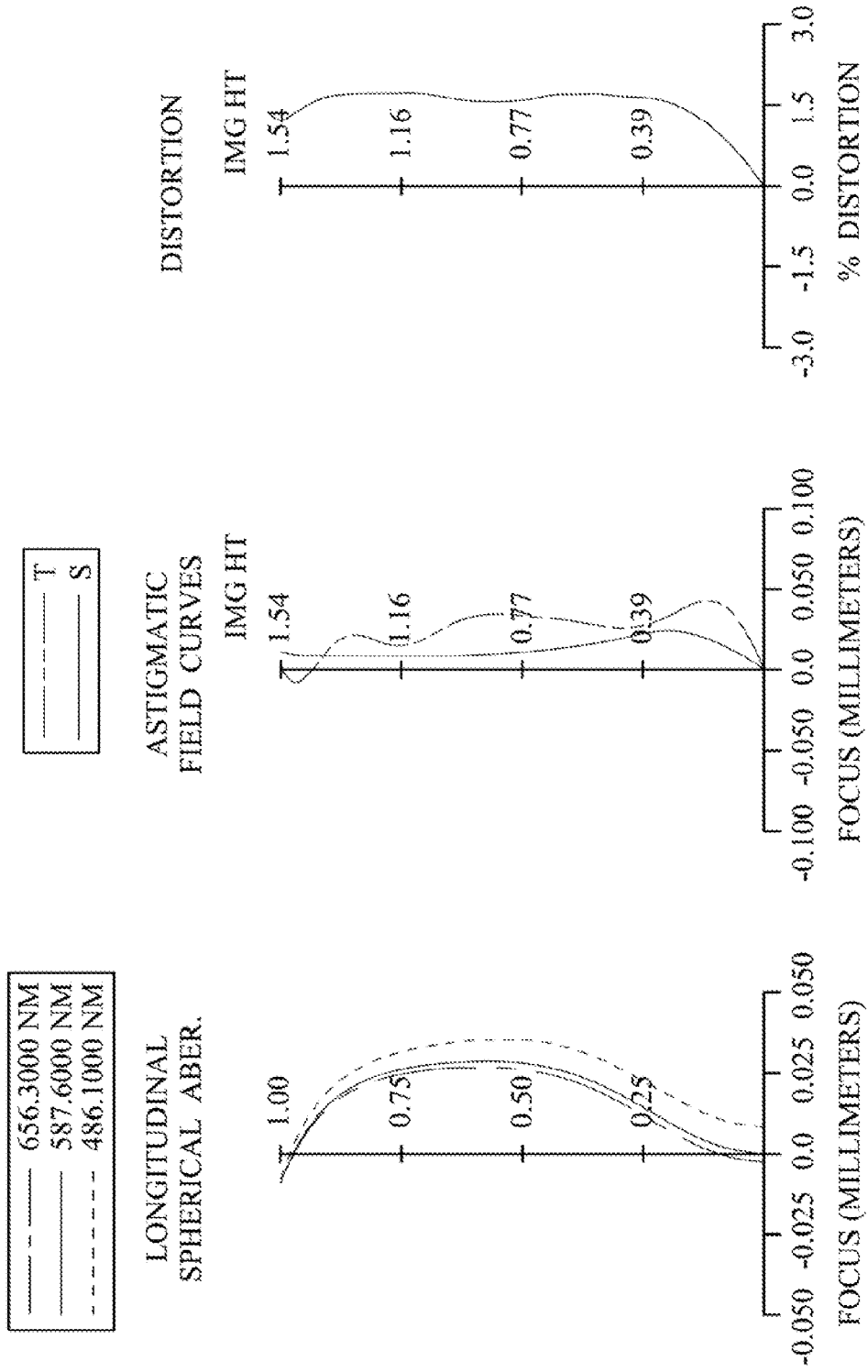
FIG. 6 shows spherical aberration curves, astigmatic field curves and a distortion curve of the imaging lens assembly according to the 3rd embodiment.

FIG. 5 is a schematic view of an imaging lens assembly according to the 3rd embodiment of the present disclosure. FIG. 6 shows spherical aberration curves, astigmatic field curves and a distortion curve of the imaging lens assembly according to the 3rd embodiment. In FIG. 5, the imaging lens assembly includes, in order from an object side to an image side, a first lens element 310, a second lens element 320, an aperture stop 300, a third lens element 330, a fourth lens element 340, a fifth lens element 350, an IR-cut filter 370 and an image plane 360.

The first lens element 310 with negative refractive power has an object-side surface 311 being concave at a paraxial region thereof and an image-side surface 312 being convex at a paraxial region thereof, wherein the object-side surface 311 of the first lens element 310 changes from concave at the paraxial region thereof to convex at a peripheral region thereof. The first lens element 310 is made of plastic material and has the object-side surface 311 and the image-side surface 312 being both aspheric.

The second lens element 320 with positive refractive power has a concave object-side surface 321 and a convex image-side surface 322. The second lens element 320 is made of plastic material and has the object-side surface 321 and the image-side surface 322 being both aspheric.

The third lens element 330 with positive refractive power has an object-side surface 331 being convex at a paraxial region thereof and an image-side surface 332 being convex at a paraxial region thereof. The third lens element 330 is made of plastic material and has the object-side surface 331 and the image-side surface 332 being both aspheric.

The fourth lens element 340 with negative refractive power has an object-side surface 341 being concave at a paraxial region thereof and an image-side surface 342 being convex at a paraxial region thereof. The fourth lens element 340 is made of plastic material and has the object-side surface 341 and the image-side surface 342 being both aspheric.

The fifth lens element 350 with positive refractive power has an object-side surface 351 being convex at a paraxial region thereof and an image-side surface 352 being concave at a paraxial region thereof, wherein the object-side surface 351 of the fifth lens element 350 changes from convex at the paraxial region thereof to concave at a peripheral region thereof. The fifth lens element 350 is made of plastic material and has the object-side surface 351 and the image-side surface 352 being both aspheric.

The IR-cut filter 370 is made of glass material which located between the fifth lens element 350 and the image plane 360, and will not affect the focal length of the imaging lens assembly.

The detailed optical data of the 3rd embodiment are shown in Table 5 and the aspheric surface data are shown in Table 6 below.

TABLE 5

3rd Embodiment
f = 1.11 mm, Fno = 2.00, HFOV = 53.7 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −1.891 | (ASP) | 0.538 | Plastic | 1.544 | 55.9 | −40.05 |
| 2 | | −2.278 | (ASP) | 0.272 | | | | |
| 3 | Lens 2 | −1.626 | (ASP) | 0.323 | Plastic | 1.544 | 55.9 | 8.18 |
| 4 | | −1.274 | (ASP) | −0.038 | | | | |
| 5 | Ape. Stop | Plano | | 0.068 | | | | |
| 6 | Lens 3 | 1.828 | (ASP) | 0.842 | Plastic | 1.544 | 55.9 | 0.82 |
| 7 | | −0.495 | (ASP) | 0.084 | | | | |
| 8 | Lens 4 | −0.236 | (ASP) | 0.230 | Plastic | 1.634 | 23.8 | −0.59 |
| 9 | | −0.881 | (ASP) | 0.030 | | | | |
| 10 | Lens 5 | 0.384 | (ASP) | 0.422 | Plastic | 1.535 | 56.3 | 0.97 |
| 11 | | 0.911 | (ASP) | 0.400 | | | | |
| 12 | IR-cut filter | Plano | | 0.145 | Glass | 1.517 | 64.2 | — |
| 13 | | Plano | | 0.153 | | | | |
| 14 | Image | Plano | | — | | | | |

Note:
Reference wavelength (d-line) is 587.6 nm.

TABLE 6

Aspheric Coefficients

| | Surface # | | | |
|---|---|---|---|---|
| 1 | 2 | 3 | 4 | 6 |
| k = −2.0000E+01 | −2.0000E+01 | −1.9968E+01 | −9.3476E+00 | 1.2367E+00 |
| A4 = 1.5399E−01 | 6.2635E−01 | −2.0882E−01 | −8.0758E−01 | −5.0412E−01 |
| A6 = −5.0252E−02 | −1.0110E+00 | −3.5864E+00 | −3.9612E−01 | 4.3618E+00 |

TABLE 6-continued

| Aspheric Coefficients | | | | | |
|---|---|---|---|---|---|
| A8 = | −1.7731E−02 | 1.6824E+00 | 2.8874E+01 | 8.9836E+00 | −9.2994E+01 |
| A10 = | 4.9081E−02 | −1.0369E+00 | −1.1994E+02 | −4.8878E+01 | 7.8314E+02 |
| A12 = | −2.8043E−02 | −1.2972E−01 | 1.8703E+02 | 1.9727E+02 | −3.3211E+03 |
| A14 = | 5.9558E−03 | 7.8672E−01 | 1.8214E−06 | −1.6096E−08 | 5.7411E+03 |

| | Surface # | | | | |
|---|---|---|---|---|---|
| | 7 | 8 | 9 | 10 | 11 |
| k = | −8.6142E+00 | −3.4376E+00 | −1.8398E−02 | −5.8200E+00 | −7.5331E−01 |
| A4 = | −4.8339E+00 | −5.1726E+00 | −1.1448E+00 | 1.6813E−02 | −4.3084E−01 |
| A6 = | 2.0562E+01 | 3.9173E+01 | 1.4360E+01 | −9.7903E−01 | −5.0090E−01 |
| A8 = | −6.7600E+01 | −1.6292E+02 | −4.5494E+01 | 2.2584E+00 | 1.7184E+00 |
| A10 = | 1.3588E+02 | 3.6999E+02 | 8.0531E+01 | −3.1104E+00 | −2.3444E+00 |
| A12 = | −1.5482E+02 | −4.1555E+02 | −7.6798E+01 | 2.4671E+00 | 1.7026E+00 |
| A14 = | 8.4439E+01 | 1.6685E+02 | 3.0947E+01 | −9.9623E−01 | −6.4944E−01 |
| A16 = | | | | 1.5897E−01 | 1.0221E−01 |

In the imaging lens assembly according to the 3rd embodiment, the definitions of f, Fno, HFOV, V3, V4, Td, R1, R5, R6, R7, R8, f1, f3, Y51, Y11, Yc51, tan α and FOV are the same as those stated in the 1st embodiment with corresponding values for the 3rd embodiment. Moreover, these parameters can be calculated from Table 5 and Table 6 as the following values and satisfy the following relationships:

| f (mm) | 1.11 | (R7 − R8)/(R7 + R8) | −0.58 |
|---|---|---|---|
| Fno | 2.00 | R1/f1 | 0.05 |
| HFOV (deg.) | 53.7 | f/f3 | 1.35 |
| V3 − V4 | 32.1 | |Y51/Y11| | 0.85 |
| Td (mm) | 2.771 | |Yc51/Y51| | 0.76 |
| |R6/R5| | 0.27 | tan α | 0.266 |
| R7/R6 | 0.48 | FOV (deg.) | 107.4 |

4th Embodiment

Figure 7:
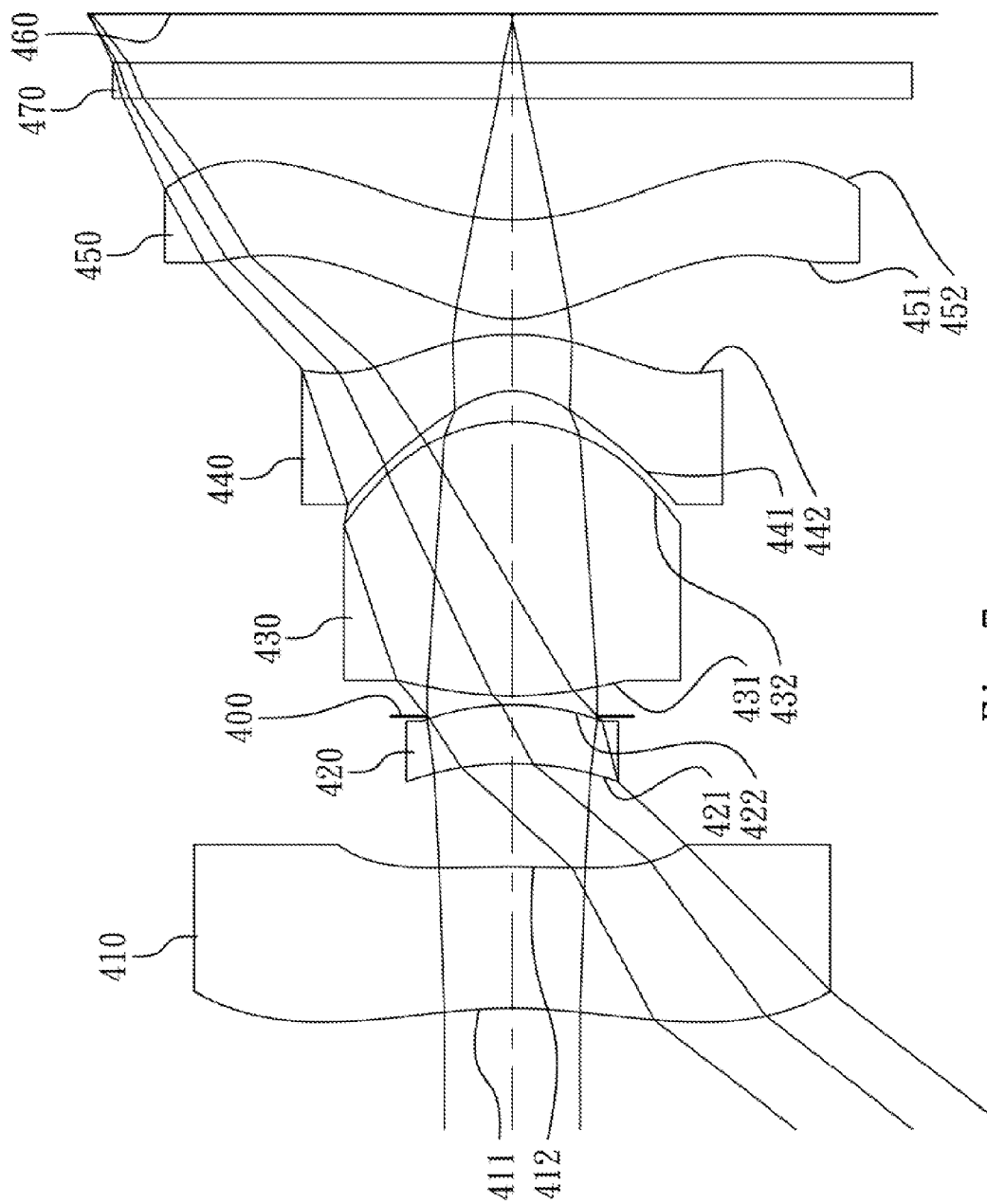
FIG. 7 is a schematic view of an imaging lens assembly according to the 4th embodiment of the present disclosure.
Figure 8:
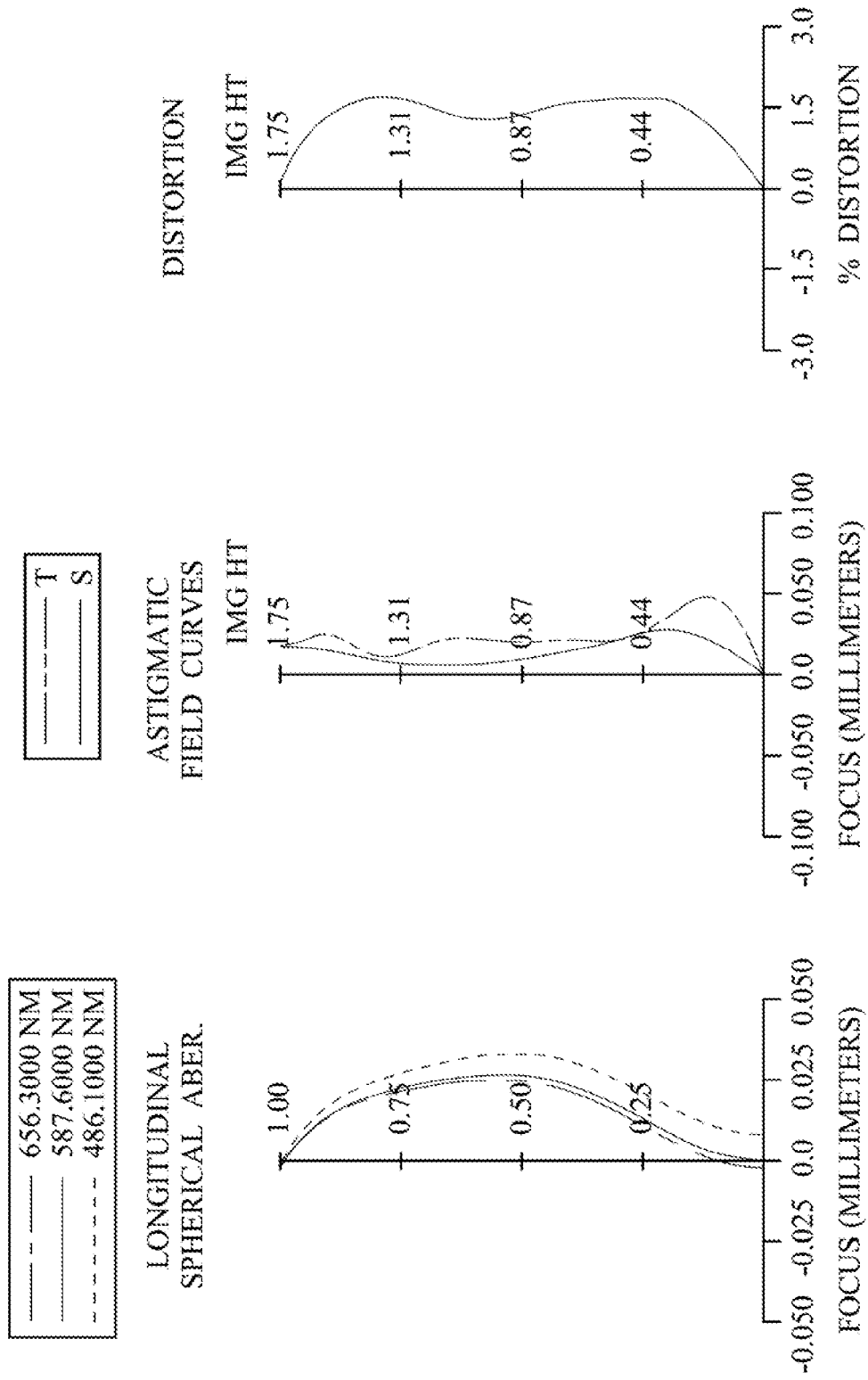
FIG. 8 shows spherical aberration curves, astigmatic field curves and a distortion curve of the imaging lens assembly according to the 4th embodiment.

FIG. 7 is a schematic view of an imaging lens assembly according to the 4th embodiment of the present disclosure. FIG. 8 shows spherical aberration curves, astigmatic field curves and a distortion curve of the imaging lens assembly according to the 4th embodiment. In FIG. 7, the imaging lens assembly includes, in order from an object side to an image side, a first lens element 410, a second lens element 420, an aperture stop 400, a third lens element 430, a fourth lens element 440, a fifth lens element 450, an IR-cut filter 470 and an image plane 460.

The first lens element 410 with negative refractive power has an object-side surface 411 being concave at a paraxial region thereof and an image-side surface 412 being convex at a paraxial region thereof, wherein the object-side surface 411 of the first lens element 410 changes from concave at the paraxial region thereof to convex at a peripheral region thereof. The first lens element 410 is made of plastic material and has the object-side surface 411 and the image-side surface 412 being both aspheric.

The second lens element 420 with positive refractive power has a concave object-side surface 421 and a convex image-side surface 422. The second lens element 420 is made of plastic material and has the object-side surface 421 and the image-side surface 422 being both aspheric.

The third lens element 430 with positive refractive power has an object-side surface 431 being convex at a paraxial region thereof and an image-side surface 432 being convex at a paraxial region thereof. The third lens element 430 is made of plastic material and has the object-side surface 431 and the image-side surface 432 being both aspheric.

The fourth lens element 440 with negative refractive power has an object-side surface 441 being concave at a paraxial region thereof and an image-side surface 442 being convex at a paraxial region thereof. The fourth lens element 440 is made of plastic material and has the object-side surface 441 and the image-side surface 442 being both aspheric.

The fifth lens element 450 with positive refractive power has an object-side surface 451 being convex at a paraxial region thereof and an image-side surface 452 being concave at a paraxial region thereof, wherein the object-side surface 451 of the fifth lens element 450 changes from convex at the paraxial region thereof to concave at a peripheral region thereof. The fifth lens element 450 is made of plastic material and has the object-side surface 451 and the image-side surface 452 being both aspheric.

The IR-cut filter 470 is made of glass material which located between the fifth lens element 450 and the image plane 460, and will not affect the focal length of the imaging lens assembly.

The detailed optical data of the 4th embodiment are shown in Table 7 and the aspheric surface data are shown in Table 8 below.

TABLE 7

4th Embodiment
f = 1.34 mm, Fno = 2.40, HFOV = 52.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −2.129 | (ASP) | 0.583 | Plastic | 1.535 | 56.3 | −7.27 |
| 2 | | −5.161 | (ASP) | 0.426 | | | | |
| 3 | Lens 2 | −1.285 | (ASP) | 0.240 | Plastic | 1.535 | 56.3 | 13.33 |

TABLE 7-continued

4th Embodiment
f = 1.34 mm, Fno = 2.40, HFOV = 52.3 deg.

| Surface # | | Curvature Radius | | Thickness | Material | Index | Abbe # | Focal length |
|---|---|---|---|---|---|---|---|---|
| 4 | | −1.160 | (ASP) | −0.045 | | | | |
| 5 | Ape. Stop | Plano | | 0.082 | | | | |
| 6 | Lens 3 | 1.488 | (ASP) | 1.132 | Plastic | 1.544 | 55.9 | 1.00 |
| 7 | | −0.629 | (ASP) | 0.127 | | | | |
| 8 | Lens 4 | −0.292 | (ASP) | 0.230 | Plastic | 1.640 | 23.3 | −0.73 |
| 9 | | −1.020 | (ASP) | 0.067 | | | | |
| 10 | Lens 5 | 0.464 | (ASP) | 0.408 | Plastic | 1.544 | 55.9 | 1.23 |
| 11 | | 1.042 | (ASP) | 0.500 | | | | |
| 12 | IR-cut filter | Plano | | 0.145 | Glass | 1.517 | 64.2 | — |
| 13 | | Plano | | 0.204 | | | | |
| 14 | Image | Plano | | — | | | | |

Note:
Reference wavelength (d-line) is 587.6 nm.

TABLE 8

Aspheric Coefficients

| | Surface # | | | | |
|---|---|---|---|---|---|
| | 1 | 2 | 3 | 4 | 6 |
| k = | −2.0000E+01 | −1.7703E+01 | −7.5654E+00 | −5.3069E+00 | −5.2523E−01 |
| A4 = | 1.3496E−01 | 5.3948E−01 | −1.9724E−01 | −6.5210E−01 | −4.0867E−01 |
| A6 = | −3.8217E−02 | −3.5155E−01 | −2.1682E+00 | −8.2009E−01 | 2.9207E+00 |
| A8 = | −7.5214E−04 | 6.4710E−01 | 1.0495E+01 | 1.1064E+01 | −3.1763E+01 |
| A10 = | 1.2473E−02 | −3.4072E−01 | −3.5199E+01 | −4.5931E+01 | 1.9828E+02 |
| A12 = | −5.8602E−03 | −1.4404E−01 | 3.5927E+01 | 3.7781E+01 | −6.3650E+02 |
| A14 = | 1.0027E−03 | 1.3736E+00 | 9.4154E−07 | 3.9951E−08 | 8.1414E+02 |

| | Surface # | | | | |
|---|---|---|---|---|---|
| | 7 | 8 | 9 | 10 | 11 |
| k = | −9.6180E+00 | −3.5706E+00 | −5.6184E−02 | −5.9270E+00 | −7.5978E−01 |
| A4 = | −2.7616E+00 | −3.3951E+00 | −7.2378E−01 | 2.3102E−02 | −2.8104E−01 |
| A6 = | 9.1514E+00 | 1.8820E+01 | 6.7647E+00 | −4.5728E−01 | −2.3021E−01 |
| A8 = | −2.3470E+01 | −5.7231E+01 | −1.5894E+01 | 7.8800E−01 | 5.9996E−01 |
| A10= | 3.6043E+01 | 9.4857E+01 | 2.0826E+01 | −8.0582E−01 | −6.0721E−01 |
| A12 = | −2.9177E+01 | −8.0072E+01 | −1.4716E+01 | 4.7192E−01 | 3.2577E−01 |
| A14 = | 9.4874E+00 | 2.4646E+01 | 4.3887E+00 | −1.4132E−01 | −9.2094E−02 |
| A16= | | | | 1.6850E−02 | 1.0827E−02 |

In the imaging lens assembly according to the 4th embodiment, the definitions of f, Fno, HFOV, V3, V4, Td, R1, R5, R6, R7, R8, f1, f3, Y51, Y11, Yc51, tan α and FOV are the same as those stated in the 1st embodiment with corresponding values for the 4th embodiment. Moreover, these parameters can be calculated from Table 7 and Table 8 as the following values and satisfy the following relationships:

| f (mm) | 1.34 | (R7 − R8)/(R7 + R8) | −0.56 |
|---|---|---|---|
| Fno | 2.40 | R1/f1 | 0.29 |
| HFOV (deg.) | 52.3 | f/f3 | 1.34 |
| V3 − V4 | 32.6 | |Y51/Y11| | 0.97 |
| Td (mm) | 3.250 | |Yc51/Y51| | 0.78 |
| |R6/R5| | 0.42 | tan α | 0.264 |
| R7/R6 | 0.46 | FOV (deg.) | 104.6 |

5th Embodiment

Figure 9:
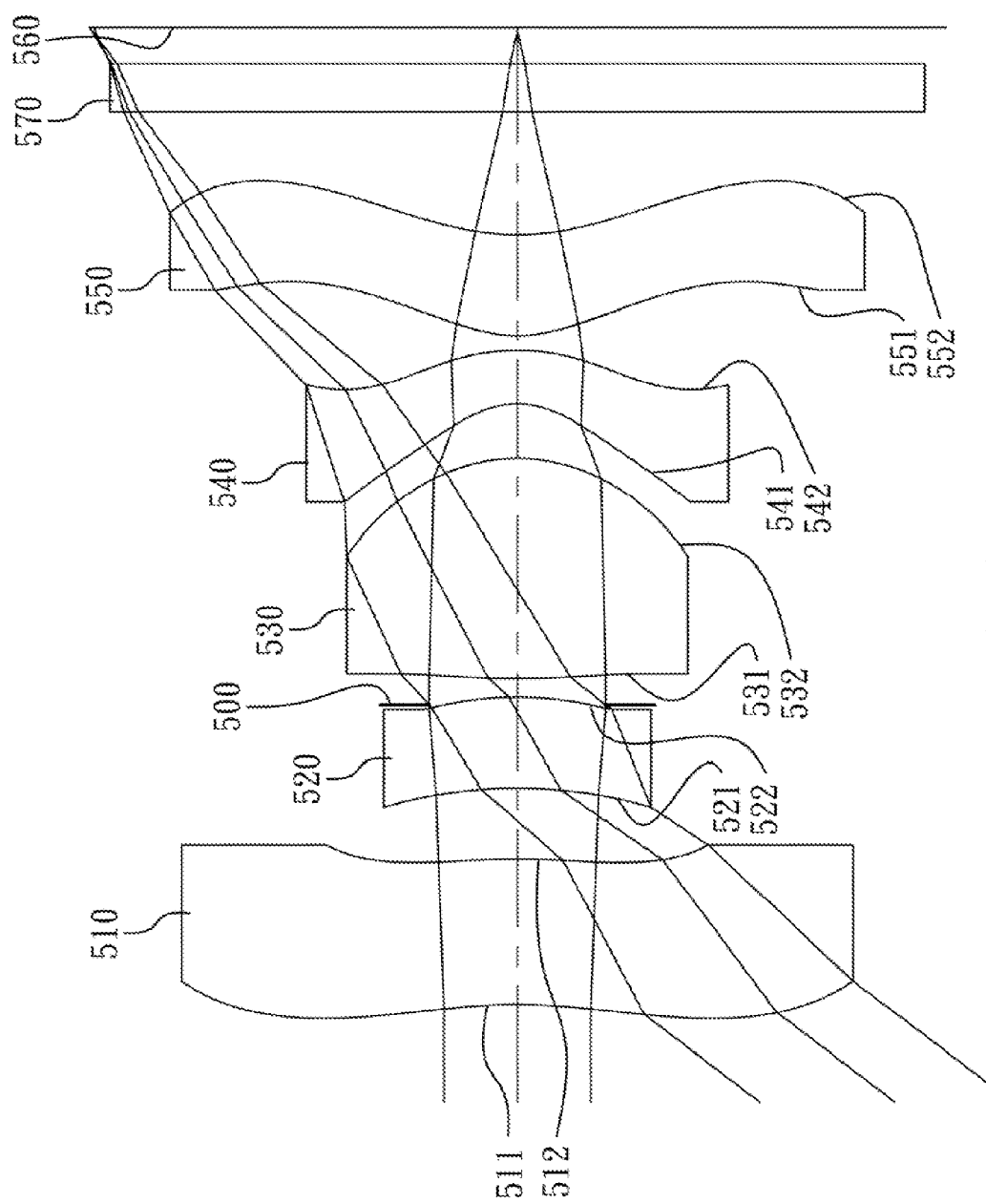
FIG. 9 is a schematic view of an imaging lens assembly according to the 5th embodiment of the present disclosure.
Figure 10:
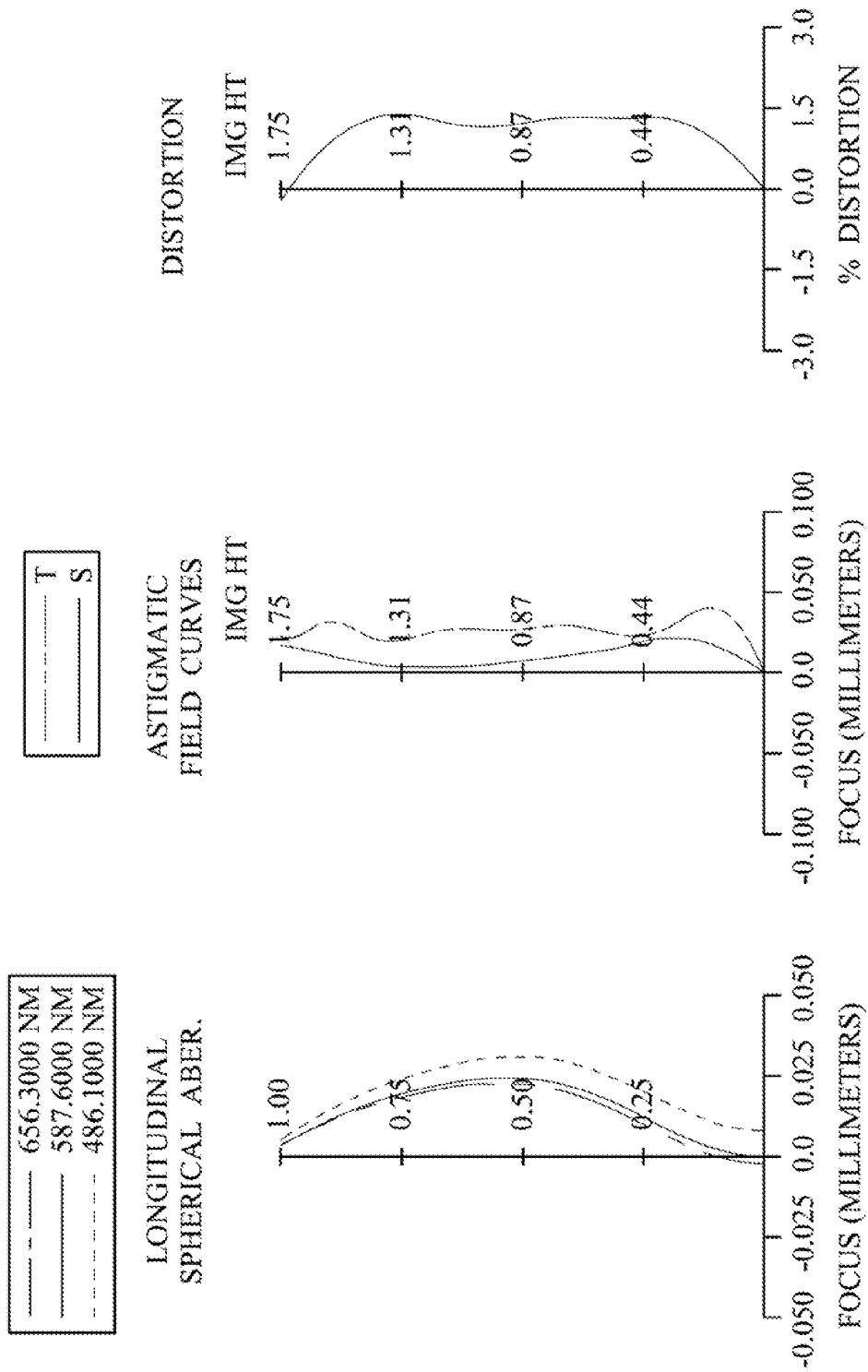
FIG. 10 shows spherical aberration curves, astigmatic field curves and a distortion curve of the imaging lens assembly according to the 5th embodiment.

FIG. 9 is a schematic view of an imaging lens assembly according to the 5th embodiment of the present disclosure. FIG. 10 shows spherical aberration curves, astigmatic field curves and a distortion curve of the imaging lens assembly according to the 5th embodiment. In FIG. 9, the imaging lens assembly includes, in order from an object side to an image side, a first lens element 510, a second lens element 520, an aperture stop 500, a third lens element 530, a fourth lens element 540, a fifth lens element 550, an IR-cut filter 570 and an image plane 560.

The first lens element 510 with negative refractive power has an object-side surface 511 being concave at a paraxial region thereof and an image-side surface 512 being convex at a paraxial region thereof, wherein the object-side surface 511 of the first lens element 510 changes from concave at the paraxial region thereof to convex at a peripheral region thereof. The first lens element 510 is made of plastic material and has the object-side surface 511 and the image-side surface 512 being both aspheric.

The second lens element 520 with positive refractive power has a concave object-side surface 521 and a convex image-side surface 522. The second lens element 520 is made of plastic material and has the object-side surface 521 and the image-side surface 522 being both aspheric.

The third lens element 530 with positive refractive power has an object-side surface 531 being convex at a paraxial region thereof and an image-side surface 532 being convex at a paraxial region thereof. The third lens element 530 is made of glass material and has the object-side surface 531 and the image-side surface 532 being both aspheric.

The fourth lens element 540 with negative refractive power has an object-side surface 541 being concave at a paraxial region thereof and an image-side surface 542 being convex at a paraxial region thereof. The fourth lens element 540 is made of plastic material and has the object-side surface 541 and the image-side surface 542 being both aspheric.

The fifth lens element 550 with positive refractive power has an object-side surface 551 being convex at a paraxial region thereof and an image-side surface 552 being concave at a paraxial region thereof, wherein the object-side surface 551 of the fifth lens element 550 changes from convex at the paraxial region thereof to concave at a peripheral region thereof. The fifth lens element 550 is made of plastic material and has the object-side surface 551 and the image-side surface 552 being both aspheric.

The IR-cut filter 570 is made of glass material which located between the fifth lens element 550 and the image plane 560, and will not affect the focal length of the imaging lens assembly.

The detailed optical data of the 5th embodiment are shown in Table 9 and the aspheric surface data are shown in Table 10 below.

TABLE 9

5th Embodiment
f = 1.32 mm, Fno = 2.20, HFOV = 52.8 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −2.154 | (ASP) | 0.596 | Plastic | 1.544 | 55.9 | −20.11 |
| 2 | | −2.944 | (ASP) | 0.290 | | | | |
| 3 | Lens 2 | −1.847 | (ASP) | 0.373 | Plastic | 1.544 | 55.9 | 6.56 |
| 4 | | −1.304 | (ASP) | −0.033 | | | | |
| 5 | Ape. Stop | Plano | | 0.110 | | | | |
| 6 | Lens 3 | 4.983 | (ASP) | 0.900 | Glass | 1.569 | 71.3 | 1.15 |
| 7 | | −0.703 | (ASP) | 0.222 | | | | |
| 8 | Lens 4 | −0.317 | (ASP) | 0.220 | Plastic | 1.640 | 23.3 | −0.89 |
| 9 | | −0.902 | (ASP) | 0.059 | | | | |
| 10 | Lens 5 | 0.493 | (ASP) | 0.415 | Plastic | 1.544 | 55.9 | 1.35 |
| 11 | | 1.051 | (ASP) | 0.500 | | | | |
| 12 | IR-cut filter | Plano | | 0.200 | Glass | 1.517 | 64.2 | — |
| 13 | | Plano | | 0.147 | | | | |
| 14 | Image | Plano | | — | | | | |

Note:
Reference wavelength (d-line) is 587.6 nm.

TABLE 10

Aspheric Coefficients

| | Surface # | | | | |
|---|---|---|---|---|---|
| | 1 | 2 | 3 | 4 | 6 |
| k = | −2.0000E+01 | −1.3626E+01 | −1.7086E+01 | −1.6393E+01 | 1.2600E+00 |
| A4 = | 1.3800E−01 | 5.6659E−01 | −5.9975E−02 | −3.9608E−01 | 2.2722E−01 |
| A6= | −5.6063E−02 | −7.3169E−01 | −1.5849E+00 | 7.9771E−01 | −4.6291E−01 |
| A8 = | 1.2138E−02 | 9.0924E−01 | 9.9854E+00 | −5.7207E+00 | −2.5082E+01 |
| A10 = | 1.0209E−02 | −1.2692E−01 | −3.0384E+01 | 1.8297E+01 | 1.9460E+02 |
| A12 = | −7.0825E−03 | −6.1480E−01 | 3.5927E+01 | 3.7781E+01 | −6.3650E+02 |
| A14 = | 1.4671E−03 | 5.3475E−01 | 9.4103E−07 | 4.2387E−08 | 8.1414E+02 |

| | Surface # | | | | |
|---|---|---|---|---|---|
| | 7 | 8 | 9 | 10 | 11 |
| k = | −8.0068E+00 | −3.5179E+00 | −2.5539E−01 | −6.4318E+00 | −7.6248E−01 |
| A4 = | −2.1604E+00 | −2.6625E+00 | −6.2434E−01 | −2.5858E−02 | −3.1098E−01 |
| A6 = | 7.9862E+00 | 1.7754E+01 | 6.8902E+00 | −4.4515E−01 | −2.0399E−01 |
| A8 = | −2.3178E+01 | −5.6750E+01 | −1.6043E+01 | 8.0335E−01 | 5.8890E−01 |
| A10 = | 3.7184E+01 | 9.5795E+01 | 2.0753E+01 | −8.0619E−01 | −6.0362E−01 |
| A12 = | −3.1348E+01 | −8.1161E+01 | −1.4570E+01 | 4.6936E−01 | 3.2544E−01 |
| A14 = | 1.1321E+01 | 2.6092E+01 | 4.3462E+00 | −1.4224E−01 | −9.2650E−02 |
| A16= | | | | 1.7335E−02 | 1.0972E−02 |

In the imaging lens assembly according to the 5th embodiment, the definitions of f, Fno, HFOV, V3, V4, Td, R1, R5, R6, R7, R8, f1, f3, Y51, Y11, Yc51, tan α and FOV are the same as those stated in the 1st embodiment with corresponding values for the 5th embodiment. Moreover, these parameters can be calculated from Table 9 and Table 10 as the following values and satisfy the following relationships:

| f (mm) | 1.32 | (R7 − R8)/(R7 + R8) | −0.48 |
|---|---|---|---|
| Fno | 2.20 | R1/f1 | 0.11 |
| HFOV (deg.) | 52.8 | f/f3 | 1.15 |
| V3 − V4 | 48.0 | |Y51/Y11| | 0.90 |
| Td (mm) | 3.152 | |Yc51/Y51| | 0.75 |
| |R6/R5| | 0.14 | tan α | 0.237 |
| R7/R6 | 0.45 | FOV (deg.) | 105.6 |

6th Embodiment

Figure 11:
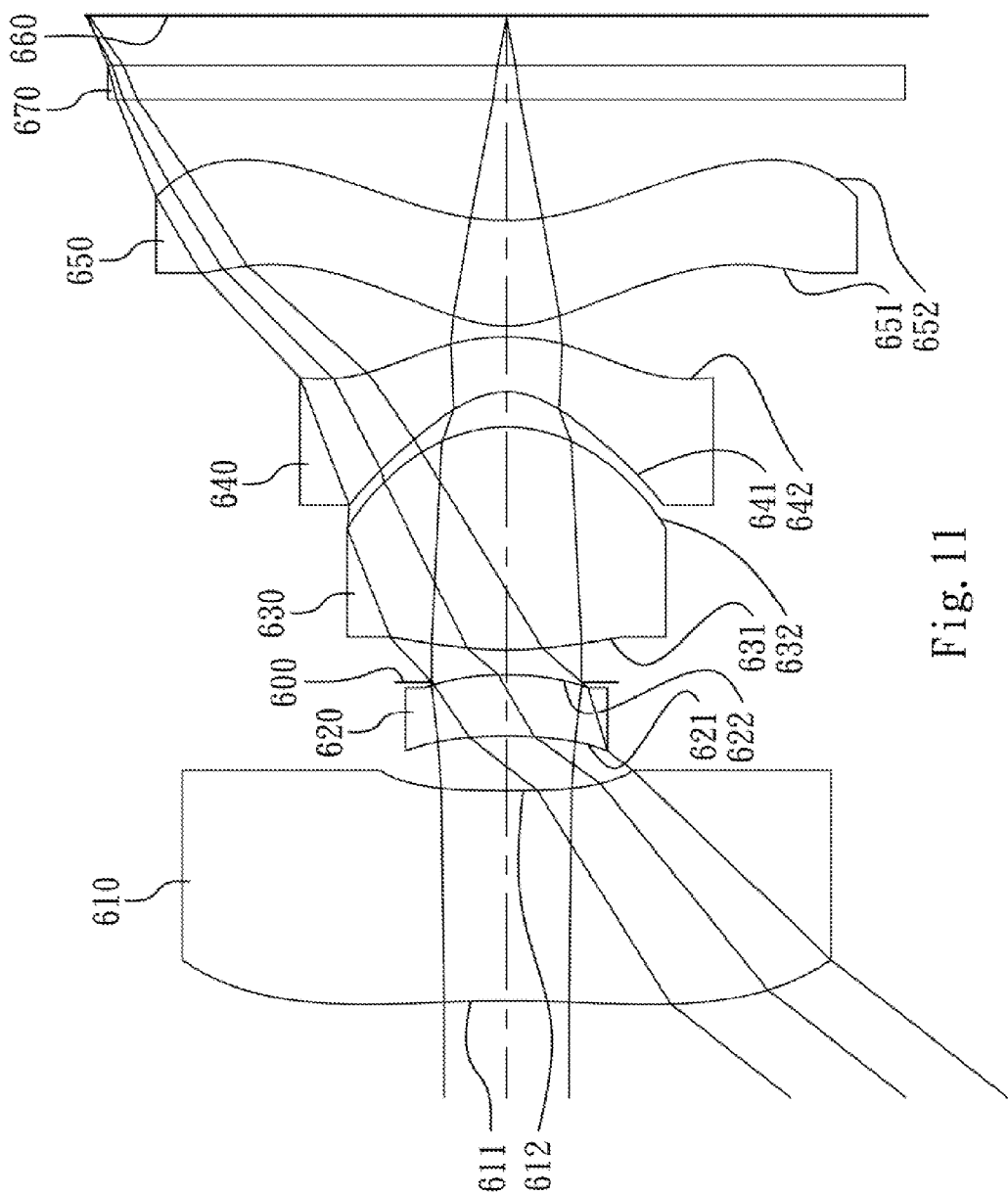
FIG. 11 is a schematic view of an imaging lens assembly according to the 6th embodiment of the present disclosure.
Figure 12:
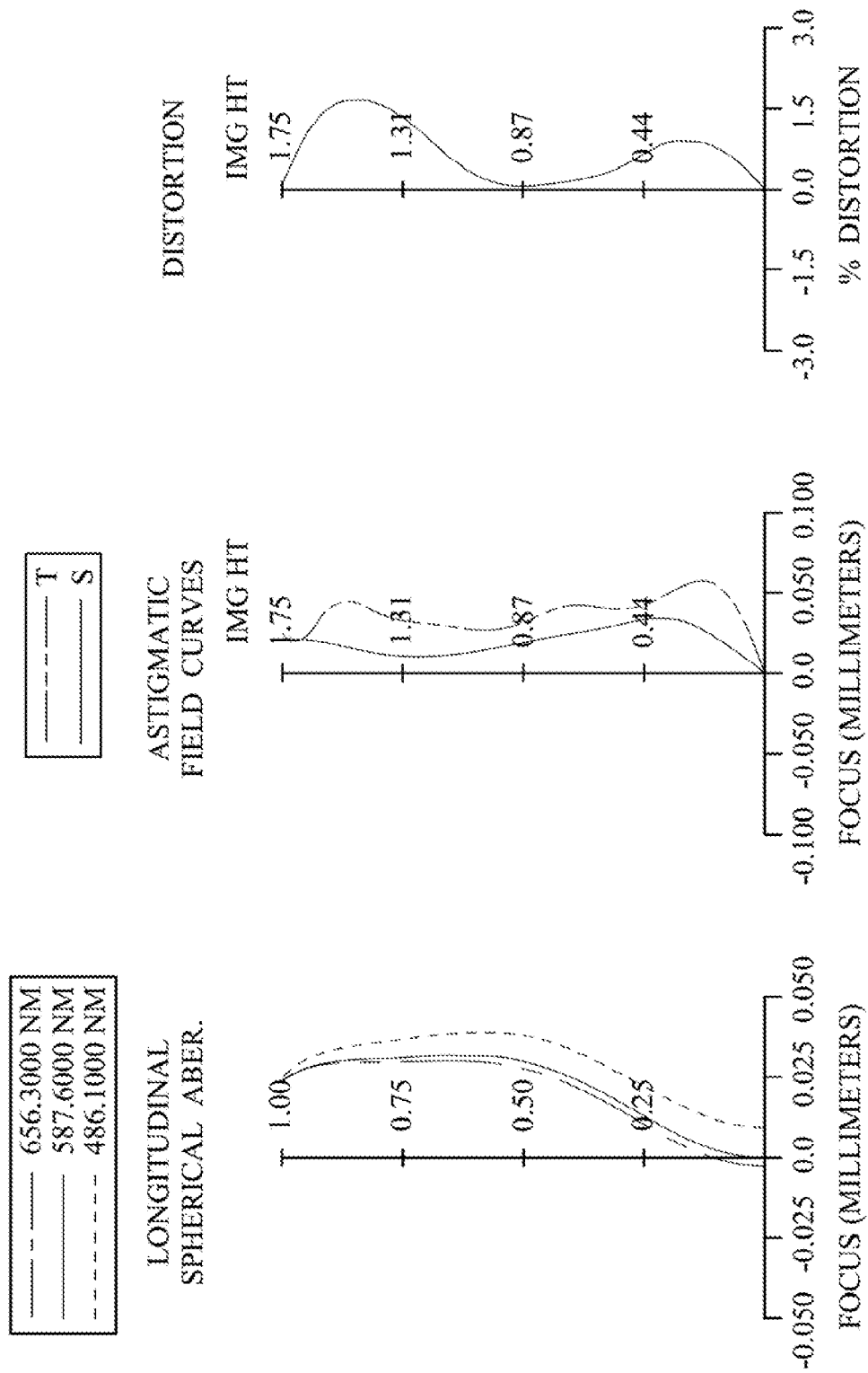
FIG. 12 shows spherical aberration curves, astigmatic field curves and a distortion curve of the imaging lens assembly according to the 6th embodiment.

FIG. 11 is a schematic view of an imaging lens assembly according to the 6th embodiment of the present disclosure. FIG. 12 shows spherical aberration curves, astigmatic field curves and a distortion curve of the imaging lens assembly according to the 6th embodiment. In FIG. 11, the imaging lens assembly includes, in order from an object side to an image side, a first lens element 610, a second lens element 620, an aperture stop 600, a third lens element 630, a fourth lens element 640, a fifth lens element 650, an IR-cut filter 670 and an image plane 660.

The first lens element 610 with negative refractive power has an object-side surface 611 being concave at a paraxial region thereof and an image-side surface 612 being concave at a paraxial region thereof, wherein the object-side surface 611 of the first lens element 610 changes from concave at the paraxial region thereof to convex at a peripheral region thereof. The first lens element 610 is made of plastic material and has the object-side surface 611 and the image-side surface 612 being both aspheric.

The second lens element 620 with positive refractive power has a concave object-side surface 621 and a convex image-side surface 622. The second lens element 620 is made of plastic material and has the object-side surface 621 and the image-side surface 622 being both aspheric.

The third lens element 630 with positive refractive power has an object-side surface 631 being convex at a paraxial region thereof and an image-side surface 632 being convex at a paraxial region thereof. The third lens element 630 is made of plastic material and has the object-side surface 631 and the image-side surface 632 being both aspheric.

The fourth lens element 640 with negative refractive power has an object-side surface 641 being concave at a paraxial region thereof and an image-side surface 642 being convex at a paraxial region thereof. The fourth lens element 640 is made of plastic material and has the object-side surface 641 and the image-side surface 642 being both aspheric.

The fifth lens element 650 with positive refractive power has an object-side surface 651 being convex at a paraxial region thereof and an image-side surface 652 being concave at a paraxial region thereof, wherein the object-side surface 651 of the fifth lens element 650 changes from convex at the paraxial region thereof to concave at a peripheral region thereof. The fifth lens element 650 is made of plastic material and has the object-side surface 651 and the image-side surface 652 being both aspheric.

The IR-cut filter 670 is made of glass material which located between the fifth lens element 650 and the image plane 660, and will not affect the focal length of the imaging lens assembly.

The detailed optical data of the 6th embodiment are shown in Table 11 and the aspheric surface data are shown in Table 12 below.

TABLE 11

6th Embodiment
f = 1.35 mm, Fno = 2.60, HFOV = 52.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −5.452 | (ASP) | 0.877 | Plastic | 1.535 | 56.3 | −5.01 |
| 2 | | 5.566 | (ASP) | 0.225 | | | | |
| 3 | Lens 2 | −1.890 | (ASP) | 0.257 | Plastic | 1.535 | 56.3 | 6.42 |
| 4 | | −1.277 | (ASP) | −0.031 | | | | |
| 5 | Ape. Stop | Plano | | 0.135 | | | | |
| 6 | Lens 3 | 1.735 | (ASP) | 0.927 | Plastic | 1.544 | 55.9 | 0.95 |
| 7 | | −0.598 | (ASP) | 0.144 | | | | |
| 8 | Lens 4 | −0.283 | (ASP) | 0.230 | Plastic | 1.640 | 23.3 | −0.71 |
| 9 | | −0.978 | (ASP) | 0.045 | | | | |
| 10 | Lens 5 | 0.460 | (ASP) | 0.440 | Plastic | 1.544 | 55.9 | 1.21 |
| 11 | | 1.009 | (ASP) | 0.500 | | | | |
| 12 | IR-cut filter | Plano | | 0.145 | Glass | 1.517 | 64.2 | — |
| 13 | | Plano | | 0.205 | | | | |
| 14 | Image | Plano | | — | | | | |

Note:
Reference wavelength (d-line) is 587.6 nm.

TABLE 12

Aspheric Coefficients

| | Surface # | | | | |
|---|---|---|---|---|---|
| | 1 | 2 | 3 | 4 | 6 |
| k = | −1.8581E+01 | 2.0000E+00 | −4.1157E+00 | −2.3802E+00 | −2.1443E+00 |
| A4 = | 1.4600E−01 | 5.9395E−01 | −2.5729E−01 | −8.1378E−01 | −4.5108E−01 |
| A6 = | −5.5910E−02 | 5.3776E−01 | −2.4400E+00 | −1.6305E+00 | 3.5763E+00 |

TABLE 12-continued

| Aspheric Coefficients | | | | | |
|---|---|---|---|---|---|
| A8 = | 9.8809E-03 | -1.4669E+00 | 9.9117E+00 | 2.6246E+01 | -3.5488E+01 |
| A10 = | 1.0668E-02 | 2.9800E+00 | -3.6134E+01 | -1.1054E+02 | 2.0513E+02 |
| A12 = | -6.9053E-03 | 1.0619E+01 | 3.5927E+01 | 3.7781E+01 | -6.3650E+02 |
| A14 = | 1.4013E-03 | 5.8877E+00 | 9.4526E-07 | 3.9798E-08 | 8.1414E+02 |

| | Surface # | | | | |
|---|---|---|---|---|---|
| | 7 | 8 | 9 | 10 | 11 |
| k = | -6.3568E+00 | -3.0785E+00 | -1.9324E-01 | -5.9921E+00 | -7.7107E-01 |
| A4 = | -2.6018E+00 | -3.2962E+00 | -7.8830E-01 | 1.9762E-02 | -2.9422E-01 |
| A6 = | 8.8040E+00 | 1.8762E+01 | 6.8156E+00 | -4.5851E-01 | -2.2431E-01 |
| A8 = | -2.3798E+01 | -5.8018E+01 | -1.5860E+01 | 7.8830E-01 | 6.0008E-01 |
| A10 = | 3.5528E+01 | 9.4388E+01 | 2.0799E+01 | -8.0566E-01 | -6.0749E-01 |
| A12 = | -2.9929E+01 | -7.8751E+01 | -1.4769E+01 | 4.7194E-01 | 3.2564E-01 |
| A14 = | 1.5160E+01 | 2.7736E+01 | 4.4039E+00 | -1.4134E-01 | -9.2155E-02 |
| A16= | | | | 1.6829E-02 | 1.0800E-02 |

In the imaging lens assembly according to the 6th embodiment, the definitions of f, Fno, HFOV, V3, V4, Td, R1, R5, R6, R7, R8, f1, f3, Y51, Y11, Yc51, tan α and FOV are the same as those stated in the 1st embodiment with corresponding values for the 6th embodiment. Moreover, these parameters can be calculated from Table 11 and Table 12 as the following values and satisfy the following relationships:

| f (mm) | 1.35 | (R7 − R8)/(R7 + R8) | -0.55 |
|---|---|---|---|
| Fno | 2.60 | R1/f1 | 1.09 |
| HFOV (deg.) | 52.1 | f/f3 | 1.42 |
| V3 − V4 | 32.6 | |Y51/Y11| | 0.94 |
| Td (mm) | 3.249 | |Yc51/Y51| | 0.77 |
| |R6/R5| | 0.34 | tan α | 0.263 |
| R7/R6 | 0.47 | FOV (deg.) | 104.2 |

7th Embodiment

Figure 13:
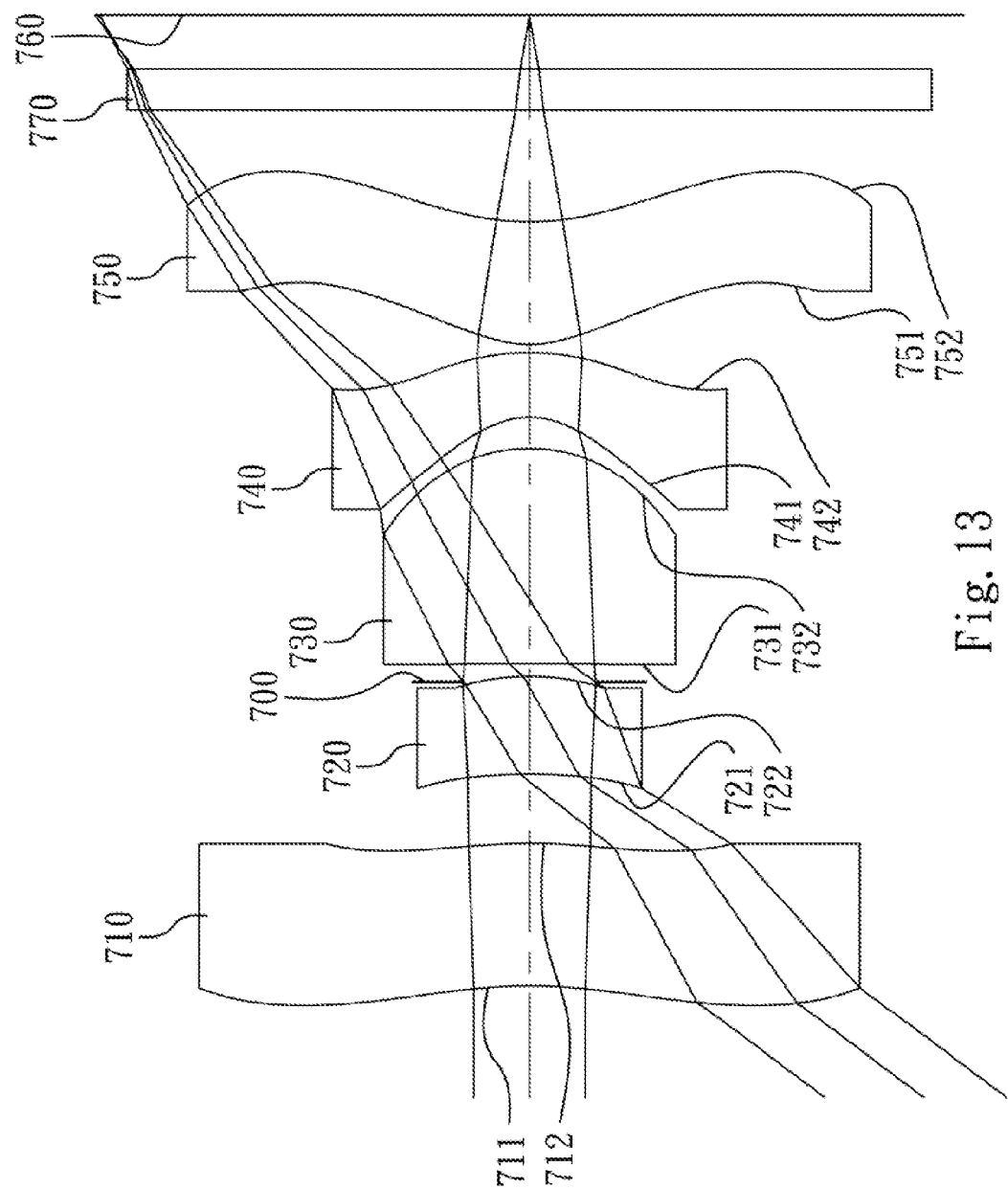
FIG. 13 is a schematic view of an imaging lens assembly according to the 7th embodiment of the present disclosure.
Figure 14:
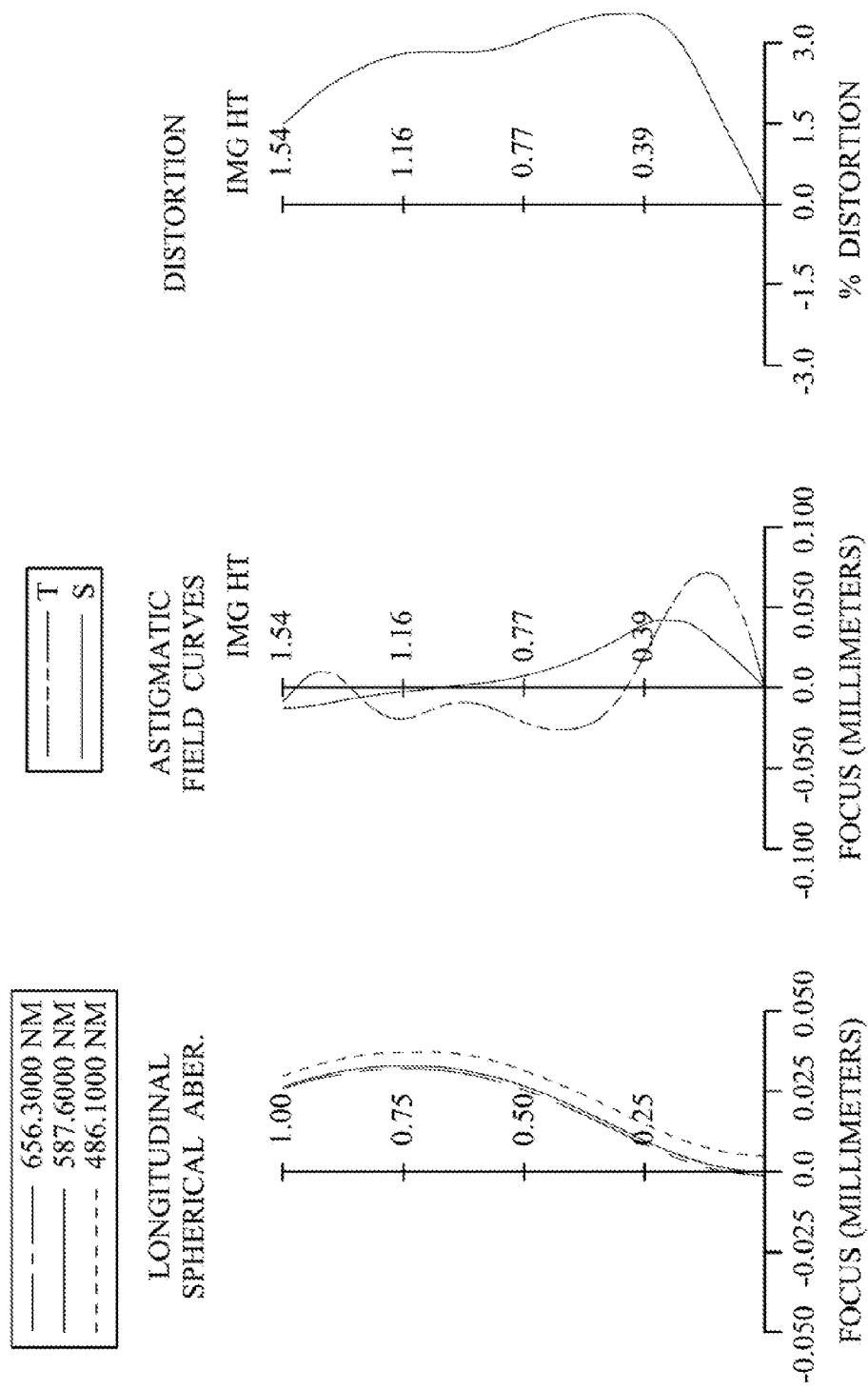
FIG. 14 shows spherical aberration curves, astigmatic field curves and a distortion curve of the imaging lens assembly according to the 7th embodiment.

FIG. 13 is a schematic view of an imaging lens assembly according to the 7th embodiment of the present disclosure. FIG. 14 shows spherical aberration curves, astigmatic field curves and a distortion curve of the imaging lens assembly according to the 7th embodiment. In FIG. 13, the imaging lens assembly includes, in order from an object side to an image side, a first lens element 710, a second lens element 720, an aperture stop 700, a third lens element 730, a fourth lens element 740, a fifth lens element 750, an IR-cut filter 770 and an image plane 760.

The first lens element 710 with negative refractive power has an object-side surface 711 being concave at a paraxial region thereof and an image-side surface 712 being convex at a paraxial region thereof, wherein the object-side surface 711 of the first lens element 710 changes from concave at the paraxial region thereof to convex at a peripheral region thereof. The first lens element 710 is made of plastic material and has the object-side surface 711 and the image-side surface 712 being both aspheric.

The second lens element 720 with positive refractive power has a concave object-side surface 721 and a convex image-side surface 722. The second lens element 720 is made of plastic material and has the object-side surface 721 and the image-side surface 722 being both aspheric.

The third lens element 730 with positive refractive power has an object-side surface 731 being concave at a paraxial region thereof and an image-side surface 732 being convex at a paraxial region thereof. The third lens element 730 is made of plastic material and has the object-side surface 731 and the image-side surface 732 being both aspheric.

The fourth lens element 740 with negative refractive power has an object-side surface 741 being concave at a paraxial region thereof and an image-side surface 742 being convex at a paraxial region thereof. The fourth lens element 740 is made of plastic material and has the object-side surface 741 and the image-side surface 742 being both aspheric.

The fifth lens element 750 with positive refractive power has an object-side surface 751 being convex at a paraxial region thereof and an image-side surface 752 being concave at a paraxial region thereof, wherein the object-side surface 751 of the fifth lens element 750 changes from convex at the paraxial region thereof to concave at a peripheral region thereof. The fifth lens element 750 is made of plastic material and has the object-side surface 751 and the image-side surface 752 being both aspheric.

The IR-cut filter 770 is made of glass material which located between the fifth lens element 750 and the image plane 760, and will not affect the focal length of the imaging lens assembly.

The detailed optical data of the 7th embodiment are shown in Table 13 and the aspheric surface data are shown in Table 14 below.

TABLE 13

7th Embodiment
f = 1.12 mm, Fno = 2.80, HFOV = 53.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | -1.703 | (ASP) | 0.510 | Plastic | 1.544 | 55.9 | -45.16 |
| 2 | | -2.023 | (ASP) | 0.249 | | | | |
| 3 | Lens 2 | -1.898 | (ASP) | 0.350 | Plastic | 1.544 | 55.9 | 2.65 |

TABLE 13-continued

7th Embodiment
f = 1.12 mm, Fno = 2.80, HFOV = 53.3 deg.

| Surface # | | Curvature Radius | | Thickness | Material | Index | Abbe # | Focal length |
|---|---|---|---|---|---|---|---|---|
| 4 | | −0.873 | (ASP) | −0.020 | | | | |
| 5 | Ape. Stop | Plano | | 0.066 | | | | |
| 6 | Lens 3 | −42.576 | (ASP) | 0.770 | Plastic | 1.544 | 55.9 | 1.18 |
| 7 | | −0.637 | (ASP) | 0.113 | | | | |
| 8 | Lens 4 | −0.275 | (ASP) | 0.231 | Plastic | 1.634 | 23.8 | −0.74 |
| 9 | | −0.880 | (ASP) | 0.030 | | | | |
| 10 | Lens 5 | 0.399 | (ASP) | 0.439 | Plastic | 1.535 | 56.3 | 1.00 |
| 11 | | 0.956 | (ASP) | 0.400 | | | | |
| 12 | IR-cut filter | Plano | | 0.145 | Glass | 1.517 | 64.2 | — |
| 13 | | Plano | | 0.196 | | | | |
| 14 | Image | Plano | | — | | | | |

Note:
Reference wavelength (d-line) is 587.6 nm.

TABLE 14

Aspheric Coefficients

| | Surface # | | | | |
|---|---|---|---|---|---|
| | 1 | 2 | 3 | 4 | 6 |
| k = | −1.8844E+01 | −1.7003E+01 | −1.3627E+01 | −7.4365E+00 | 2.0000E+00 |
| A4 = | 1.4226E−01 | 5.6572E−01 | −2.2395E−01 | −9.8665E−01 | −1.0858E−01 |
| A6 = | −4.8362E−02 | −1.0464E+00 | −3.8417E+00 | −1.5452E+00 | 1.8064E−01 |
| A8 = | −1.7286E−02 | 1.7351E+00 | 2.6905E+01 | 7.2413E+00 | −1.0075E+02 |
| A10 = | 4.8840E−02 | −1.0847E+00 | −1.2175E+02 | 2.2019E+01 | 9.1959E+02 |
| A12 = | −2.8096E−02 | −3.2165E−01 | 1.8705E+02 | 1.9727E+02 | −3.3211E+03 |
| A14 = | 5.8680E−03 | 6.2767E−01 | 3.1506E−03 | −8.5594E−05 | 5.7411E+03 |

| | Surface # | | | | |
|---|---|---|---|---|---|
| | 7 | 8 | 9 | 10 | 11 |
| k = | −6.8185E+00 | −3.2078E+00 | −1.2931E−02 | −5.5704E+00 | −7.3566E−01 |
| A4 = | −4.8681E+00 | −5.1198E+00 | −1.1288E+00 | 1.4061E−02 | −4.2377E−01 |
| A6 = | 2.0328E+01 | 3.9512E+01 | 1.4346E+01 | −9.8161E−01 | −4.9927E−01 |
| A8 = | −6.7634E+01 | −1.6250E+02 | −4.5545E+01 | 2.2578E+00 | 1.7163E+00 |
| A10 = | 1.3554E+02 | 3.7032E+02 | 8.0484E+01 | −3.1106E+00 | −2.3446E+00 |
| A12 = | −1.5592E+02 | −4.1716E+02 | −7.6769E+01 | 2.4669E+00 | 1.7025E+00 |
| A14 = | 9.3017E+01 | 1.5607E+02 | 3.1077E+01 | −9.9631E−01 | −6.4942E−01 |
| A16= | | | | 1.5891E−01 | 1.0221E−01 |

In the imaging lens assembly according to the 7th embodiment, the definitions of f, Fno, HFOV, V3, V4, Td, R1, R5, R6, R7, R8, f1, f3, Y51, Y11, Yc51, tan α and FOV are the same as those stated in the 1st embodiment with corresponding values for the 7th embodiment. Moreover, these parameters can be calculated from Table 13 and Table 14 as the following values and satisfy the following relationships:

| f (mm) | 1.12 | (R7 − R8)/(R7 + R8) | −0.52 |
|---|---|---|---|
| Fno | 2.80 | R1/f1 | 0.04 |
| HFOV (deg.) | 53.3 | f/f3 | 0.95 |
| V3 − V4 | 32.1 | |Y51/Y11| | 0.87 |
| Td (mm) | 2.738 | |Yc51/Y51| | 0.79 |
| |R6/R5| | 0.01 | tan α | 0.269 |
| R7/R6 | 0.43 | FOV (deg.) | 106.6 |

8th Embodiment

Figure 15:
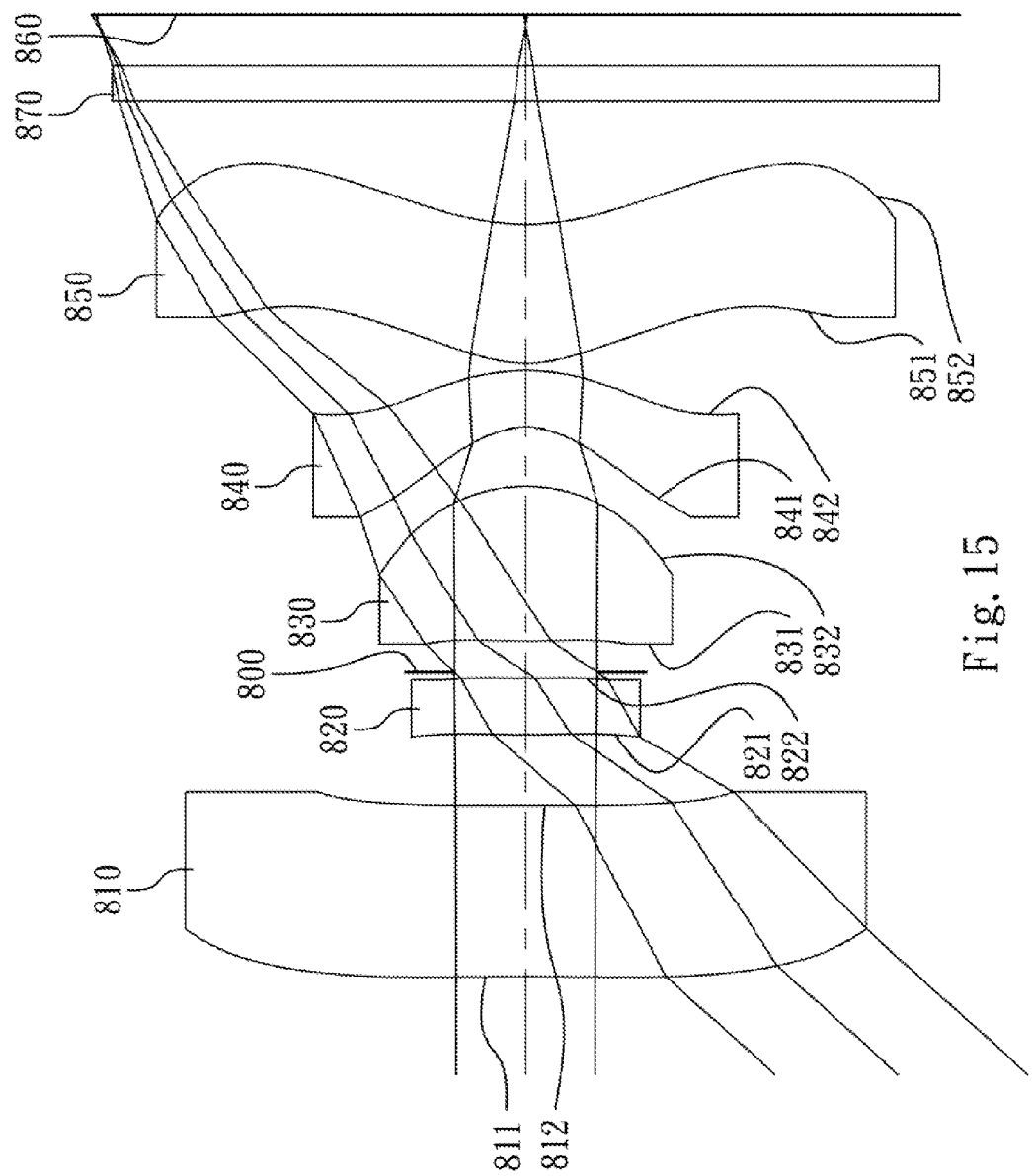
FIG. 15 is a schematic view of an imaging lens assembly according to the 8th embodiment of the present disclosure.
Figure 16:
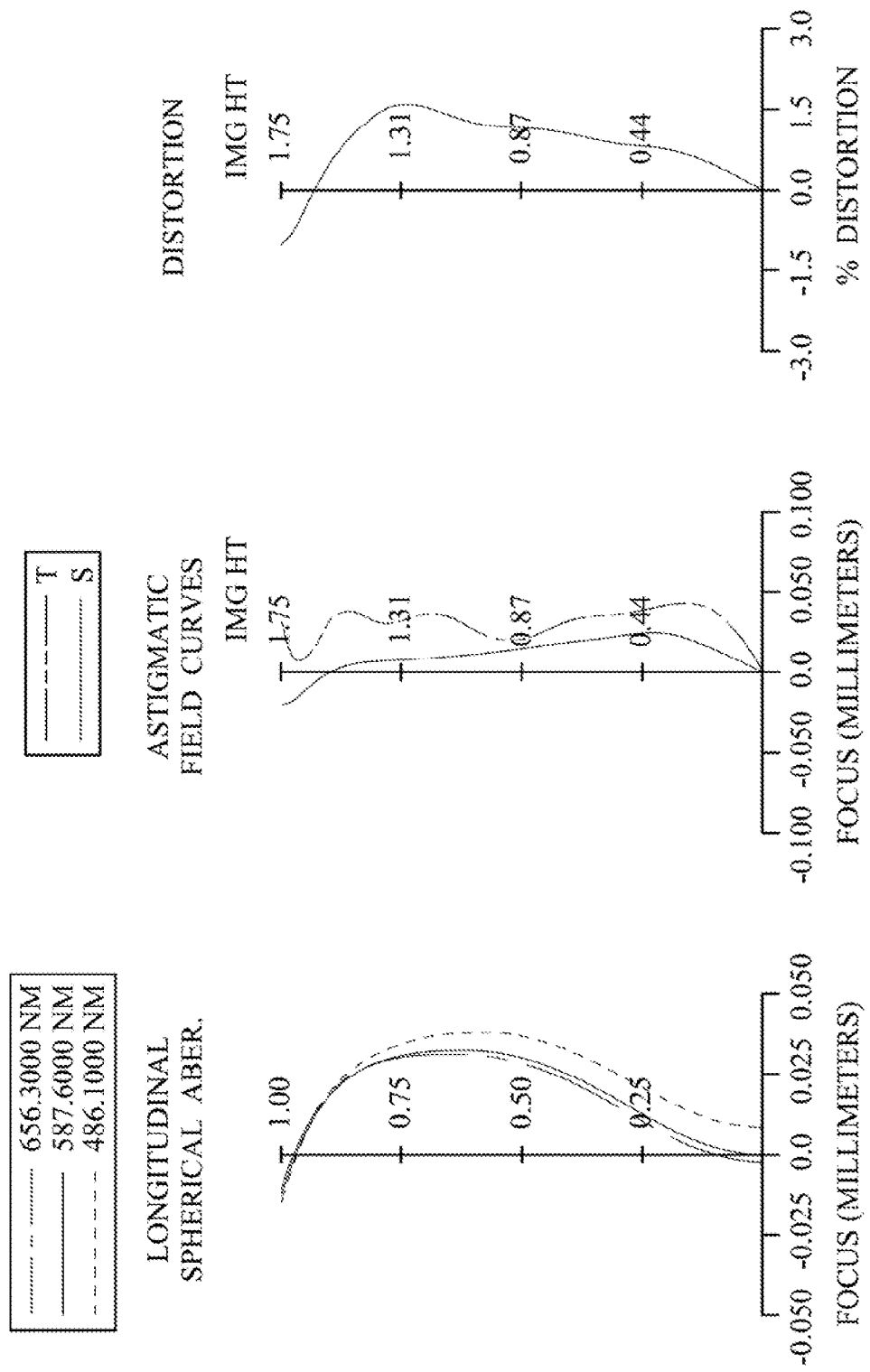
FIG. 16 shows spherical aberration curves, astigmatic field curves and a distortion curve of the imaging lens assembly according to the 8th embodiment.

FIG. 15 is a schematic view of an imaging lens assembly according to the 8th embodiment of the present disclosure. FIG. 16 shows spherical aberration curves, astigmatic field curves and a distortion curve of the imaging lens assembly according to the 8th embodiment. In FIG. 15, the imaging lens assembly includes, in order from an object side to an image side, a first lens element 810, a second lens element 820, an aperture stop 800, a third lens element 830, a fourth lens element 840, a fifth lens element 850, an IR-cut filter 870 and an image plane 860.

The first lens element 810 with negative refractive power has an object-side surface 811 being concave at a paraxial region thereof and an image-side surface 812 being convex at a paraxial region thereof, wherein the object-side surface 811 of the first lens element 810 changes from concave at the paraxial region thereof to convex at a peripheral region thereof. The first lens element 810 is made of plastic material and has the object-side surface 811 and the image-side surface 812 being both aspheric.

The second lens element 820 with positive refractive power has a convex object-side surface 821 and a concave image-side surface 822. The second lens element 820 is made of plastic material and has the object-side surface 821 and the image-side surface 822 being both aspheric.

The third lens element 830 with positive refractive power has an object-side surface 831 being convex at a paraxial region thereof and an image-side surface 832 being convex at a paraxial region thereof. The third lens element 830 is made of plastic material and has the object-side surface 831 and the image-side surface 832 being both aspheric.

The fourth lens element 840 with negative refractive power has an object-side surface 841 being concave at a paraxial region thereof and an image-side surface 842 being convex at a paraxial region thereof. The fourth lens element 840 is made of plastic material and has the object-side surface 841 and the image-side surface 842 being both aspheric.

The fifth lens element 850 with positive refractive power has an object-side surface 851 being convex at a paraxial region thereof and an image-side surface 852 being concave at a paraxial region thereof, wherein the object-side surface 851 of the fifth lens element 850 changes from convex at the paraxial region thereof to concave at a peripheral region thereof. The fifth lens element 850 is made of plastic material and has the object-side surface 851 and the image-side surface 852 being both aspheric.

The IR-cut filter 870 is made of glass material which located between the fifth lens element 850 and the image plane 860, and will not affect the focal length of the imaging lens assembly.

The detailed optical data of the 8th embodiment are shown in Table 15 and the aspheric surface data are shown in Table 16 below.

TABLE 15

8th Embodiment
f = 1.58 mm, Fno = 2.80, HFOV = 48.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −16.792 | (ASP) | 0.696 | Plastic | 1.634 | 23.8 | −39.09 |
| 2 | | −52.920 | (ASP) | 0.285 | | | | |
| 3 | Lens 2 | 5.752 | (ASP) | 0.230 | Plastic | 1.535 | 56.3 | 33.88 |
| 4 | | 8.312 | (ASP) | 0.025 | | | | |
| 5 | Ape. Stop | Plano | | 0.126 | | | | |
| 6 | Lens 3 | 4.435 | (ASP) | 0.632 | Plastic | 1.544 | 55.9 | 1.09 |
| 7 | | −0.651 | (ASP) | 0.239 | | | | |
| 8 | Lens 4 | −0.315 | (ASP) | 0.230 | Plastic | 1.640 | 23.3 | −0.86 |
| 9 | | −0.943 | (ASP) | 0.030 | | | | |
| 10 | Lens 5 | 0.491 | (ASP) | 0.566 | Plastic | 1.544 | 55.9 | 1.26 |
| 11 | | 1.019 | (ASP) | 0.500 | | | | |
| 12 | IR-cut filter | Plano | | 0.145 | Glass | 1.517 | 64.2 | — |
| 13 | | Plano | | 0.206 | | | | |
| 14 | Image | Plano | | — | | | | |

Note:
Reference wavelength (d-line) is 587.6 nm.

TABLE 16

Aspheric Coefficients

| | Surface # | | | | |
|---|---|---|---|---|---|
| | 1 | 2 | 3 | 4 | 6 |
| k = | 2.0000E+00 | 2.0000E+00 | −4.4304E+00 | −2.0000E+01 | −2.0000E+01 |
| A4 = | 9.5937E−02 | 1.4372E−01 | −6.8322E−01 | −1.0959E+00 | −1.0362E+00 |
| A6 = | −3.8560E−02 | −9.4035E−02 | −1.2702E+00 | −1.5497E+00 | 1.2222E+00 |
| A8 = | 7.6108E−03 | −2.7431E−01 | 1.6055E+01 | 5.1514E+01 | −3.8235E+01 |
| A10 = | 9.1143E−03 | 1.2968E+00 | −4.7069E+01 | −2.5877E+02 | 2.5494E+02 |
| A12 = | −6.1410E−03 | −1.8324E+00 | 3.5927E+07 | 3.7781E+01 | −6.3650E+02 |
| A14 = | 1.4205E−03 | 1.0217E+00 | 8.6277E−07 | 4.2245E−08 | 8.1414E+02 |

| | Surface # | | | | |
|---|---|---|---|---|---|
| | 7 | 8 | 9 | 10 | 11 |
| k = | −6.5225E+00 | −3.5550E+00 | −1.9704E−01 | −6.7304E+00 | −7.8078E−01 |
| A4 = | −2.8509E+00 | −3.2580E+00 | −7.4863E−01 | 1.5510E−02 | −3.0062E−01 |
| A6 = | 8.1861E+00 | 1.9331E+01 | 6.8557E+00 | −4.6332E−01 | −2.0409E−01 |
| A8 = | −2.2148E+01 | −5.7054E+01 | −1.5888E+01 | 7.9262E−01 | 5.8901E−01 |
| A10 = | 3.3829E+01 | 9.6575E+01 | 2.0758E+01 | −8.0469E−01 | −6.0781E−01 |
| A12 = | −3.8392E+01 | −7.7877E+01 | −1.4786E+01 | 4.7195E−01 | 3.2686E−01 |
| A14 = | 4.1590E+01 | 1.3346E+01 | 4.4427E+00 | −1.4145E−01 | −9.1907E−02 |
| A16= | | | | 1.6734E−02 | 1.0603E−02 |

In the imaging lens assembly according to the 8th embodiment, the definitions of f, Fno, HFOV, V3, V4, Td, R1, R5, R6, R7, R8, f1, f3, Y51, Y11, Yc51, tan α and FOV are the same as those stated in the 1st embodiment with corresponding values for the 8th embodiment. Moreover, these parameters can be calculated from Table 15 and Table 16 as the following values and satisfy the following relationships:

| f (mm) | 1.58 | (R7 − R8)/(R7 + R8) | −0.50 |
|---|---|---|---|
| Fno | 2.80 | R1/f1 | 0.43 |
| HFOV (deg.) | 48.0 | f/f3 | 1.45 |
| V3 − V4 | 32.6 | \|Y51/Y11\| | 0.91 |
| Td (mm) | 3.059 | \|Yc51/Y51\| | 0.75 |
| \|R6/R5\| | 0.15 | tan α | 0.243 |
| R7/R6 | 0.48 | FOV (deg.) | 96 |

9th Embodiment

Figure 17:
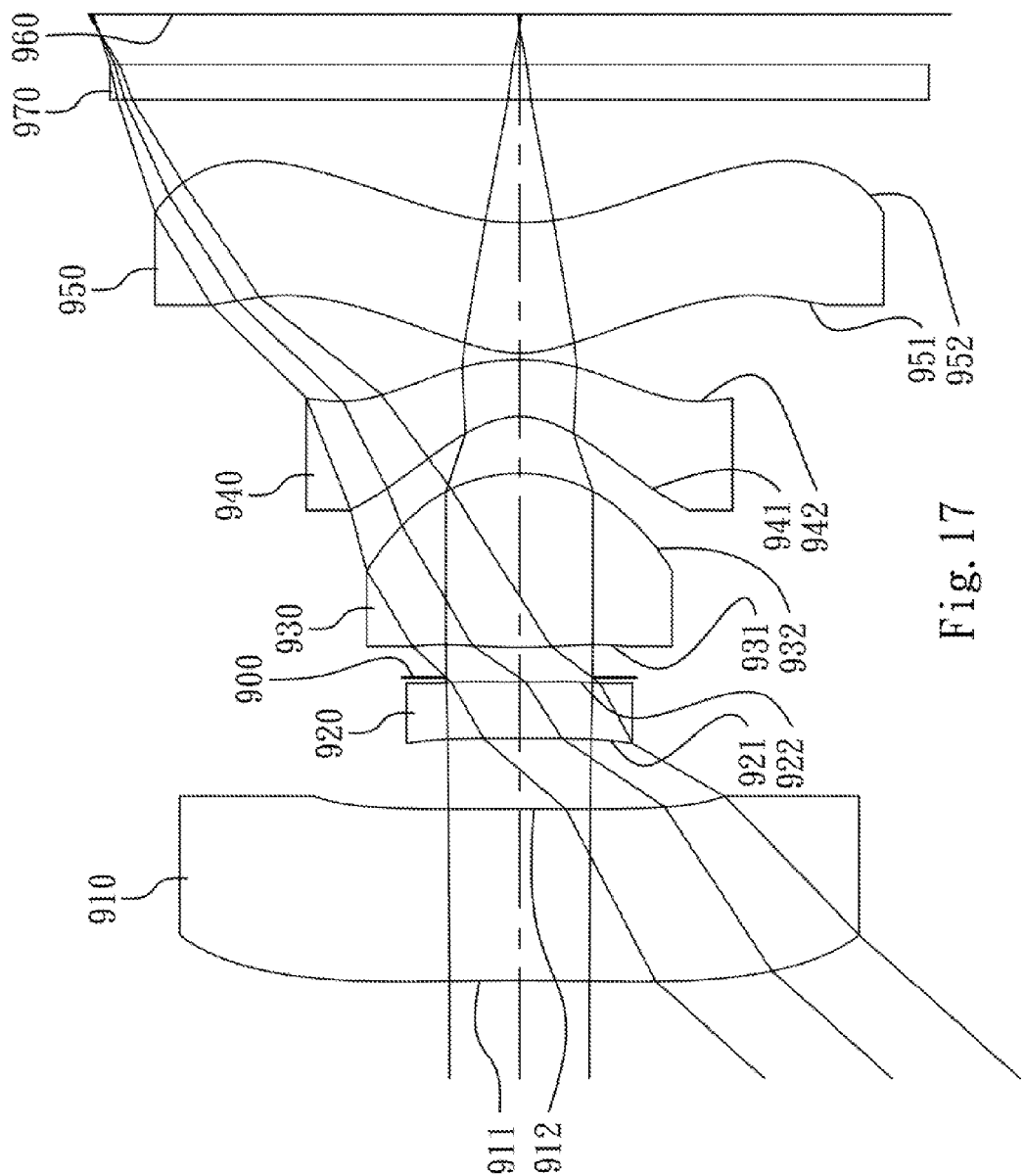
FIG. 17 is a schematic view of an imaging lens assembly according to the 9th embodiment of the present disclosure.
Figure 18:
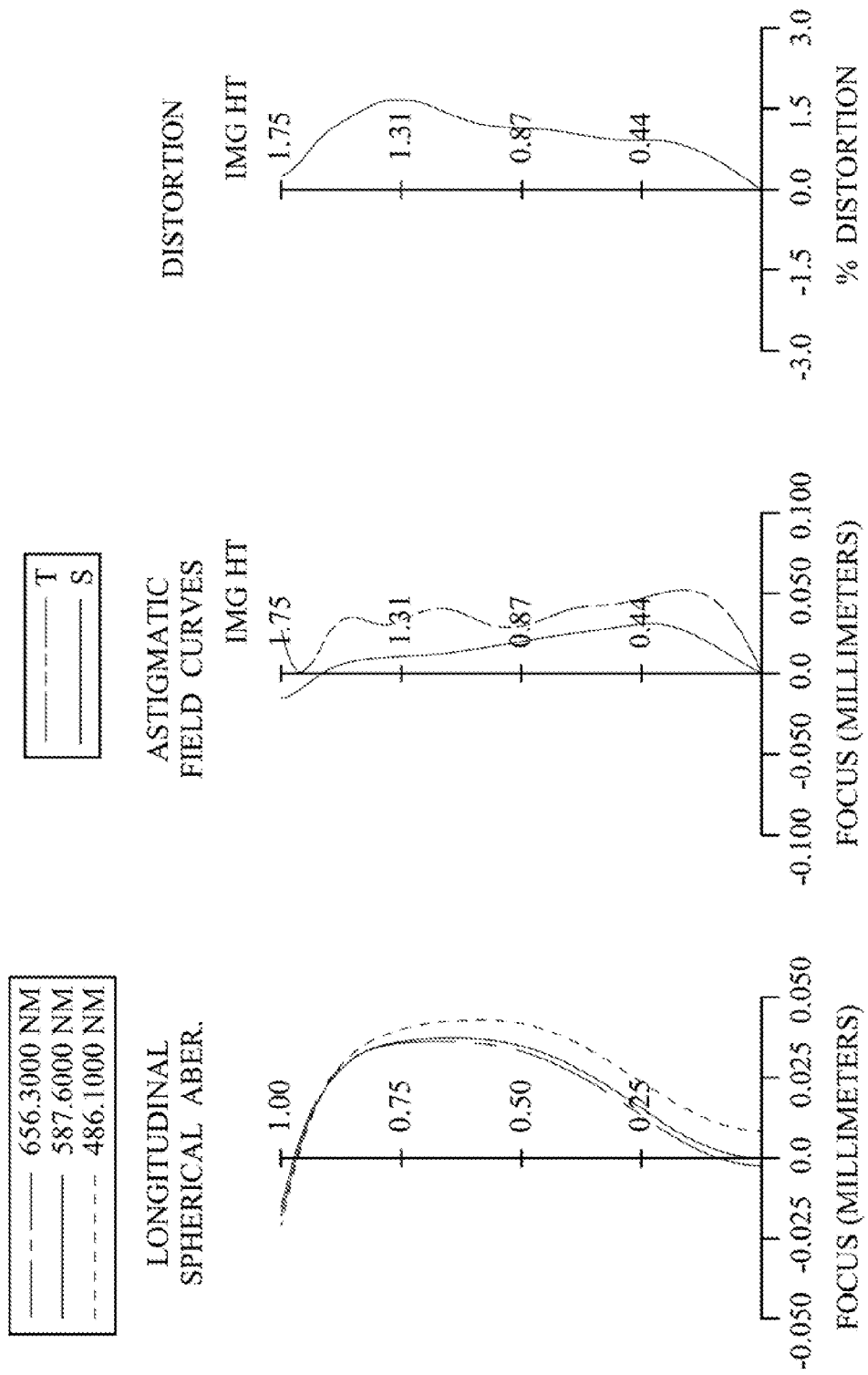
FIG. 18 shows spherical aberration curves, astigmatic field curves and a distortion curve of the imaging lens assembly according to the 9th embodiment.

FIG. 17 is a schematic view of an imaging lens assembly according to the 9th embodiment of the present disclosure. FIG. 18 shows spherical aberration curves, astigmatic field curves and a distortion curve of the imaging lens assembly according to the 9th embodiment. In FIG. 17, the imaging lens assembly includes, in order from an object side to an image side, a first lens element 910, a second lens element 920, an aperture stop 900, a third lens element 930, a fourth lens element 940, a fifth lens element 950, an IR-cut filter 970 and an image plane 960.

The first lens element 910 with negative refractive power has an object-side surface 911 being concave at a paraxial region thereof and an image-side surface 912 being convex at a paraxial region thereof, wherein the object-side surface 911 of the first lens element 910 changes from concave at the paraxial region thereof to convex at a peripheral region thereof. The first lens element 910 is made of plastic material and has the object-side surface 911 and the image-side surface 912 being both aspheric.

The second lens element 920 with negative refractive power has a convex object-side surface 921 and a concave image-side surface 922. The second lens element 920 is made of plastic material and has the object-side surface 921 and the image-side surface 922 being both aspheric.

The third lens element 930 with positive refractive power has an object-side surface 931 being convex at a paraxial region thereof and an image-side surface 932 being convex at a paraxial region thereof. The third lens element 930 is made of plastic material and has the object-side surface 931 and the image-side surface 932 being both aspheric.

The fourth lens element 940 with negative refractive power has an object-side surface 941 being concave at a paraxial region thereof and an image-side surface 942 being convex at a paraxial region thereof. The fourth lens element 940 is made of plastic material and has the object-side surface 941 and the image-side surface 942 being both aspheric.

The fifth lens element 950 with positive refractive power has an object-side surface 951 being convex at a paraxial region thereof and an image-side surface 952 being concave at a paraxial region thereof, wherein the object-side surface 951 of the fifth lens element 950 changes from convex at the paraxial region thereof to concave at a peripheral region thereof. The fifth lens element 950 is made of plastic material and has the object-side surface 951 and the image-side surface 952 being both aspheric.

The IR-cut filter 970 is made of glass material which located between the fifth lens element 950 and the image plane 960, and will not affect the focal length of the imaging lens assembly.

The detailed optical data of the 9th embodiment are shown in Table 17 and the aspheric surface data are shown in Table 18 below.

TABLE 17

9th Embodiment
f = 1.54 mm, Fno = 2.70, HFOV = 48.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −11.973 | (ASP) | 0.702 | Plastic | 1.634 | 23.8 | −38.12 |
| 2 | | −24.270 | (ASP) | 0.288 | | | | |
| 3 | Lens 2 | 22.882 | (ASP) | 0.230 | Plastic | 1.535 | 56.3 | −18.73 |
| 4 | | 6.941 | (ASP) | 0.018 | | | | |
| 5 | Ape. Stop | Plano | | 0.125 | | | | |
| 6 | Lens 3 | 2.371 | (ASP) | 0.709 | Plastic | 1.544 | 55.9 | 1.00 |
| 7 | | −0.636 | (ASP) | 0.234 | | | | |
| 8 | Lens 4 | −0.308 | (ASP) | 0.230 | Plastic | 1.640 | 23.3 | −0.83 |
| 9 | | −0.948 | (ASP) | 0.030 | | | | |
| 10 | Lens 5 | 0.485 | (ASP) | 0.533 | Plastic | 1.544 | 55.9 | 1.26 |
| 11 | | 1.006 | (ASP) | 0.500 | | | | |
| 12 | IR-cut filter | Plano | | 0.145 | Glass | 1.517 | 64.2 | — |
| 13 | | Plano | | 0.207 | | | | |
| 14 | Image | Plano | | — | | | | |

Note:
Reference wavelength (d-line) is 587.6 nm.

TABLE 18

Aspheric Coefficients

| | Surface # | | | | |
|---|---|---|---|---|---|
| | 1 | 2 | 3 | 4 | 6 |
| k = | −1.2876E+00 | 2.0000E+00 | −2.0000E+01 | 2.0000E+00 | −1.7913E+01 |
| A4 = | 1.0098E−01 | 1.5060E−01 | −7.2811E−01 | −1.2215E+00 | −9.0285E−01 |
| A6 = | −3.8508E−02 | −7.5024E−02 | −7.3121E−01 | −1.4354E+00 | 2.0984E+00 |

TABLE 18-continued

| Aspheric Coefficients | | | | | |
|---|---|---|---|---|---|
| A8 = | 7.5953E−03 | −2.7490E−01 | 1.6469E+01 | 7.0190E+01 | −4.0131E+01 |
| A10 = | 9.0579E−03 | 1.2773E+00 | −5.0129E+01 | −3.6789E+02 | 2.4721E+02 |
| A12 = | −6.1874E−03 | −1.8455E+00 | 3.5927E+01 | 3.7781E+01 | −6.3650E+02 |
| A14 = | 1.4047E−03 | 1.0450E+00 | 8.5776E−07 | 4.2302E−08 | 8.1414E+02 |

| | Surface # | | | | |
|---|---|---|---|---|---|
| | 7 | 8 | 9 | 10 | 11 |
| k = | −6.4354E+00 | −3.4325E+00 | −2.0112E−01 | −6.6643E+00 | −7.8604E−01 |
| A4 = | −2.7812E+00 | −3.2196E+00 | −7.3248E−01 | 2.0636E−02 | −3.0108E−01 |
| A6 = | 8.2883E+00 | 1.9195E+01 | 6.8730E+00 | −4.6387E−01 | −2.0589E−01 |
| A8 = | −2.2114E+01 | −5.7235E+01 | −1.5884E+01 | 7.9176E−01 | 5.8891E−01 |
| A10 = | 3.4043E+01 | 9.6634E+01 | 2.0755E+01 | −8.0496E−01 | −6.0764E−01 |
| A12 = | −3.8393E+01 | −7.7242E+01 | −1.4793E+01 | 4.7192E−01 | 3.2692E−01 |
| A14 = | 3.5783E+01 | 1.5140E+01 | 4.4346E+00 | −1.4143E−01 | −9.1907E−02 |
| A16= | | | | 1.6762E−02 | 1.0594E−02 |

In the imaging lens assembly according to the 9th embodiment, the definitions of f, Fno, HFOV, V3, V4, Td, R1, R5, R6, R7, R8, f1, f3, Y51, Y11, Yc51, tan α and FOV are the same as those stated in the 1st embodiment with corresponding values for the 9th embodiment. Moreover, these parameters can be calculated from Table 17 and Table 18 as the following values and satisfy the following relationships:

| f (mm) | 1.54 | (R7 − R8)/(R7 + R8) | −0.51 |
|---|---|---|---|
| Fno | 2.70 | R1/f1 | 0.31 |
| HFOV (deg.) | 48.3 | f/f3 | 1.54 |
| V3 − V4 | 32.6 | |Y51/Y11| | 0.91 |
| Td (mm) | 3.099 | |Yc51/Y51| | 0.76 |
| |R6/R5| | 0.27 | tan α | 0.246 |
| R7/R6 | 0.48 | FOV (deg.) | 96.6 |

10th Embodiment

Figure 19:
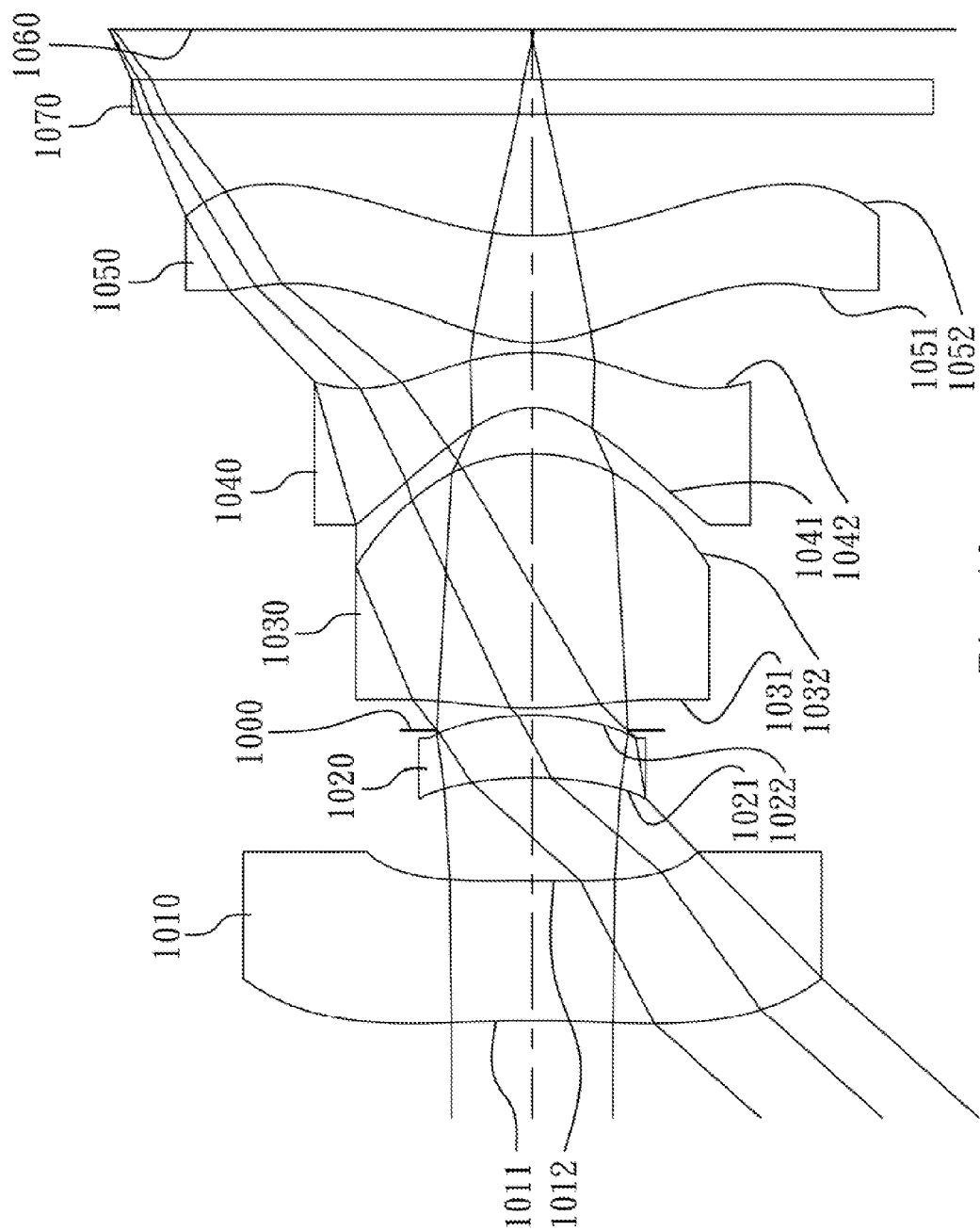
FIG. 19 is a schematic view of an imaging lens assembly according to the 10th embodiment of the present disclosure.
Figure 20:
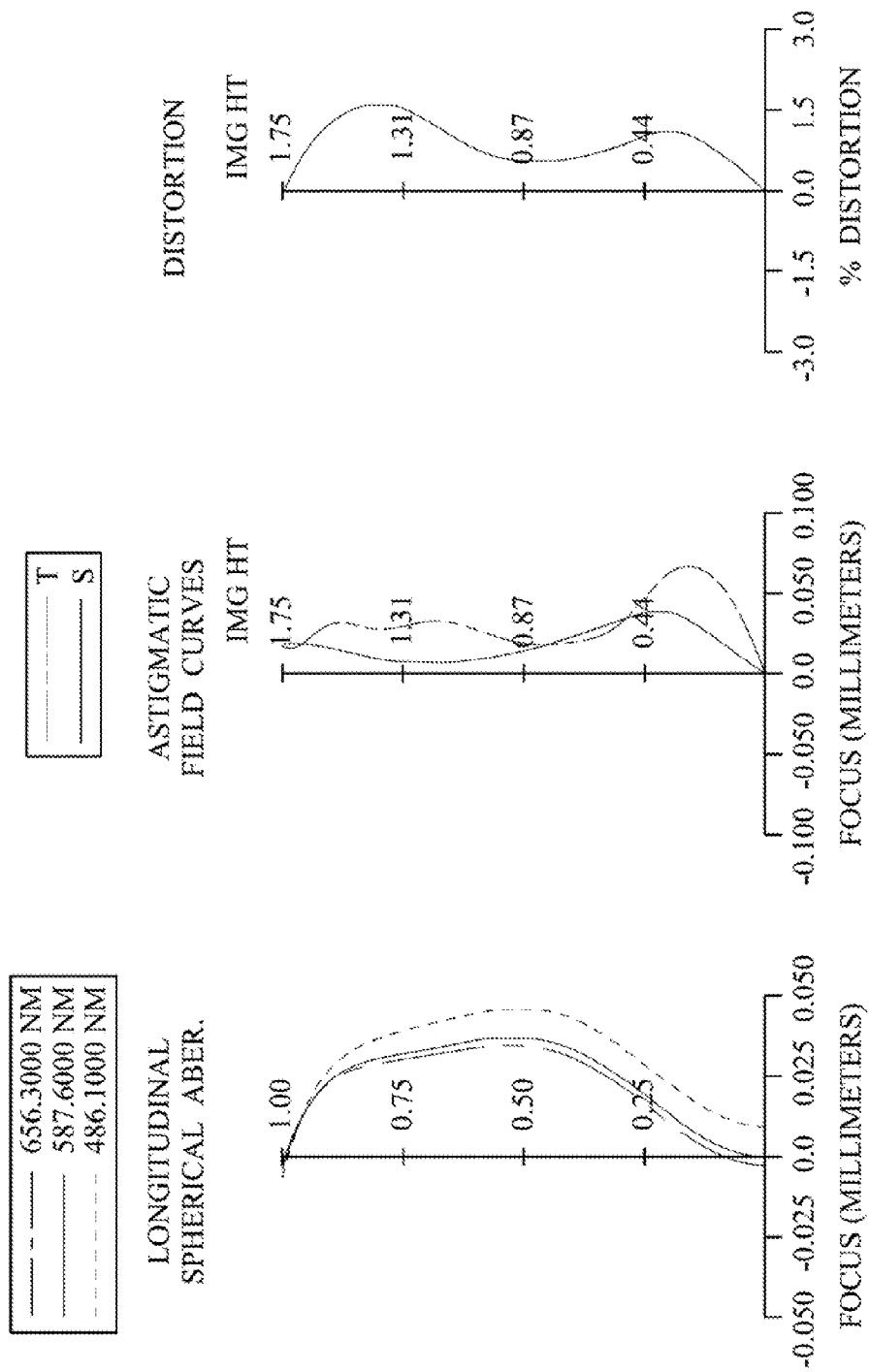
FIG. 20 shows spherical aberration curves, astigmatic field curves and a distortion curve of the imaging lens assembly according to the 10th embodiment.

FIG. 19 is a schematic view of an imaging lens assembly according to the 10th embodiment of the present disclosure. FIG. 20 shows spherical aberration curves, astigmatic field curves and a distortion curve of the imaging lens assembly according to the 10th embodiment. In FIG. 19, the imaging lens assembly includes, in order from an object side to an image side, a first lens element 1010, a second lens element 1020, an aperture stop 1000, a third lens element 1030, a fourth lens element 1040, a fifth lens element 1050, an IR-cut filter 1070 and an image plane 1060.

The first lens element 1010 with negative refractive power has an object-side surface 1011 being concave at a paraxial region thereof and an image-side surface 1012 being convex at a paraxial region thereof, wherein the object-side surface 1011 of the first lens element 1010 changes from concave at the paraxial region thereof to convex at a peripheral region thereof. The first lens element 1010 is made of plastic material and has the object-side surface 1011 and the image-side surface 1012 being both aspheric.

The second lens element 1020 with positive refractive power has a concave object-side surface 1021 and a convex image-side surface 1022. The second lens element 1020 is made of plastic material and has the object-side surface 1021 and the image-side surface 1022 being both aspheric.

The third lens element 1030 with positive refractive power has an object-side surface 1031 being convex at a paraxial region thereof and an image-side surface 1032 being convex at a paraxial region thereof. The third lens element 1030 is made of plastic material and has the object-side surface 1031 and the image-side surface 1032 being both aspheric.

The fourth lens element 1040 with negative refractive power has an object-side surface 1041 being concave at a paraxial region thereof and an image-side surface 1042 being convex at a paraxial region thereof. The fourth lens element 1040 is made of plastic material and has the object-side surface 1041 and the image-side surface 1042 being both aspheric.

The fifth lens element 1050 with positive refractive power has an object-side surface 1051 being convex at a paraxial region thereof and an image-side surface 1052 being concave at a paraxial region thereof, wherein the object-side surface 1051 of the fifth lens element 1050 changes from convex at the paraxial region thereof to concave at a peripheral region thereof. The fifth lens element 1050 is made of plastic material and has the object-side surface 1051 and the image-side surface 1052 being both aspheric.

The IR-cut filter 1070 is made of glass material which located between the fifth lens element 1050 and the image plane 1060, and will not affect the focal length of the imaging lens assembly.

The detailed optical data of the 10th embodiment are shown in Table 19 and the aspheric surface data are shown in Table 20 below.

TABLE 19

10th Embodiment
f = 1.54 mm, Fno = 2.30, HFOV = 48.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −5.731 | (ASP) | 0.581 | Plastic | 1.634 | 23.8 | −10.04 |
| 2 | | −59.524 | (ASP) | 0.426 | | | | |

TABLE 19-continued

10th Embodiment
f = 1.54 mm, Fno = 2.30, HFOV = 48.4 deg.

| Surface # | | Curvature Radius | | Thickness | Material | Index | Abbe # | Focal length |
|---|---|---|---|---|---|---|---|---|
| 3 | Lens 2 | −1.528 | (ASP) | 0.258 | Plastic | 1.535 | 56.3 | 8.01 |
| 4 | | −1.193 | (ASP) | −0.064 | | | | |
| 5 | Ape. Stop | Plano | | 0.094 | | | | |
| 6 | Lens 3 | 1.863 | (ASP) | 1.052 | Plastic | 1.544 | 55.9 | 1.13 |
| 7 | | −0.737 | (ASP) | 0.188 | | | | |
| 8 | Lens 4 | −0.317 | (ASP) | 0.230 | Plastic | 1.640 | 23.3 | −0.81 |
| 9 | | −1.046 | (ASP) | 0.041 | | | | |
| 10 | Lens 5 | 0.520 | (ASP) | 0.443 | Plastic | 1.544 | 55.9 | 1.37 |
| 11 | | 1.200 | (ASP) | 0.500 | | | | |
| 12 | IR-cut filter | Plano | | 0.145 | Glass | 1.517 | 64.2 | — |
| 13 | | Plano | | 0.204 | | | | |
| 14 | Image | Plano | | — | | | | |

Note:
Reference wavelength (d-line) is 587.6 nm.

TABLE 20

Aspheric Coefficients

| Surface # | | | | |
|---|---|---|---|---|
| 1 | 2 | 3 | 4 | 6 |
| k = −2.0000E+01 | −2.0000E+01 | −1.1136E+01 | −5.2209E+00 | −4.3278E+00 |
| A4 = 1.8954E−01 | 4.2345E−01 | −1.6920E−01 | −7.2327E−01 | −4.9488E−01 |
| A6 = −6.6375E−02 | 1.5545E−01 | −2.3500E+00 | −2.0510E+00 | 2.3877E+00 |
| A8 = 1.2372E−02 | −1.2216E−02 | 9.5345E+00 | 1.4580E+01 | −3.2048E+01 |
| A10 = 1.3775E−02 | −4.4387E−01 | −3.9678E+01 | −4.6267E+01 | 2.0032E+02 |
| A12 = −7.3463E−03 | 1.0914E+00 | 3.5927E+01 | 3.7781E+01 | −6.3650E+02 |
| A14 = 1.4901E−03 | 2.7019E+00 | 9.4940E−07 | 4.1130E−08 | 8.1414E+02 |

| Surface # | | | | |
|---|---|---|---|---|
| 7 | 8 | 9 | 10 | 11 |
| k = −9.4030E+00 | −3.0657E+00 | 4.5086E−02 | −6.7859E+00 | −6.6939E−01 |
| A4 = −2.7126E+00 | −3.2998E+00 | −6.9521E−01 | 3.3847E−02 | −2.1912E−01 |
| A6 = 9.1517E+00 | 1.8977E+01 | 6.7261E+00 | −4.5252E−01 | −2.5706E−01 |
| A8 = −2.3447E+01 | −5.7194E+01 | −1.5894E+01 | 7.8604E−01 | 6.0389E−01 |
| A10 = 3.5857E+01 | 9.4860E+01 | 2.0850E+01 | −8.0728E−01 | −6.0628E−01 |
| A12 = −2.9594E+01 | −7.9654E+01 | −1.4694E+01 | 4.7166E−01 | 3.2565E−01 |
| A14 = 1.0523E+01 | 2.5993E+01 | 4.3976E+00 | −1.4131E−01 | −9.2184E−02 |
| A16= | | | 1.6972E−02 | 1.0795E−02 |

In the imaging lens assembly according to the 10th embodiment, the definitions of f, Fno, HFOV, V3, V4, Td, R1, R5, R6, R7, R8, f1, f3, Y51, Y11, Yc51, tan α and FOV are the same as those stated in the 1st embodiment with corresponding values for the 10th embodiment. Moreover, these parameters can be calculated from Table 19 and Table 20 as the following values and satisfy the following relationships:

| | | | |
|---|---|---|---|
| f (mm) | 1.54 | (R7 − R8)/(R7 + R8) | −0.53 |
| Fno | 2.30 | R1/f1 | 0.57 |
| HFOV (deg.) | 48.4 | f/f3 | 1.36 |
| V3 − V4 | 32.6 | |Y51/Y11| | 1.05 |
| Td (mm) | 3.249 | |Yc51/Y51| | 0.79 |
| |R6/R5| | 0.40 | tan α | 0.244 |
| R7/R6 | 0.43 | FOV (deg.) | 96.8 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An imaging lens assembly comprising, in order from an object side to an image side:
   a first lens element with negative refractive power having an object-side surface being concave at a paraxial region thereof, wherein the object-side surface and an image-side surface of the first lens element are aspheric;
   a second lens element with refractive power;
   a third lens element with positive refractive power;
   a fourth lens element with negative refractive power; and
   a fifth lens element with positive refractive power having an object-side surface being convex at a paraxial region thereof and an image-side surface being concave at a paraxial region thereof, wherein the object-side surface of the fifth lens element changes from convex at the paraxial region thereof to concave at a peripheral region thereof, and the object-side surface and the image-side surface of the fifth lens element are aspheric;

wherein a minimum distance between an optical axis and a non-axial critical point on the object-side surface of the fifth lens element is Yc51, a distance in parallel with the optical axis from the non-axial critical point on the object-side surface of the fifth lens element to an axial vertex on the object-side surface of the fifth lens element is SAGc51, SAGc51/Yc51 is a tangent value of an angle α, and the following relationship is satisfied:

$0.10 < \tan \alpha < 0.60.$

2. The imaging lens assembly of claim 1, wherein the object-side surface of the first lens element changes from concave at the paraxial region thereof to convex at a peripheral region thereof.

3. The imaging lens assembly of claim 2, wherein the third lens element has an image-side surface being convex at a paraxial region thereof.

4. The imaging lens assembly of claim 3, wherein a curvature radius of an object-side surface of the third lens element is R5, a curvature radius of the image-side surface of the third lens element is R6, and the following relationship is satisfied:

$0 < |R6/R5| < 0.7.$

5. The imaging lens assembly of claim 4, wherein a curvature radius of the object-side surface of the first lens element is R1, a focal length of the first lens element is f1, and the following relationship is satisfied:

$0 < R1/f1 < 2.0.$

6. The imaging lens assembly of claim 4, wherein an effective radius of the object-side surface of the fifth lens element is Y51, an effective radius of the object-side surface of the first lens element is Y11, and the following relationship is satisfied:

$0.7 < |Y51/Y11| < 1.2.$

7. The imaging lens assembly of claim 4, wherein the fourth lens element has an object-side surface being concave at a paraxial region thereof, and an image-side surface being convex at a paraxial region thereof.

8. The imaging lens assembly of claim 4, wherein the minimum distance between the optical axis and the non-axial critical point on the object-side surface of the fifth lens element is Yc51, the distance in parallel with the optical axis from the non-axial critical point on the object-side surface of the fifth lens element to the axial vertex on the object-side surface of the fifth lens element is SAGc51, SAGc51/Yc51 is the tangent value of the angle α, and the following relationship is satisfied:

$0.15 < \tan \alpha < 0.40.$

9. The imaging lens assembly of claim 4, wherein a focal length of the imaging lens assembly is f, a focal length of the third lens element is f3, and the following relationship is satisfied:

$0.80 < f/f3 < 1.70.$

10. The imaging lens assembly of claim 4, wherein the minimum distance between the optical axis and the non-axial critical point on the object-side surface of the fifth lens element is Yc51, an effective radius of the object-side surface of the fifth lens element is Y51, and the following relationship is satisfied:

$0.7 < |Yc51/Y51| < 0.95.$

11. The imaging lens assembly of claim 10, wherein an Abbe number of the third lens element is V3, an Abbe number of the fourth lens element is V4, and the following relationship is satisfied:

$26.0 < V3 - V4 < 52.0.$

12. The imaging lens assembly of claim 10, wherein a maximal field of view of the imaging lens assembly is FOV, and the following relationship is satisfied:

80 degrees $< FOV <$ 120 degrees.

13. An imaging lens assembly comprising, in order from an object side to an image side:
a first lens element with negative refractive power having an object-side surface being concave at a paraxial region thereof, wherein the object-side surface and an image-side surface of the first lens element are aspheric;
a second lens element with refractive power;
a third lens element with positive refractive power;
a fourth lens element with negative refractive power; and
a fifth lens element with positive refractive power having an object-side surface being convex at a paraxial region thereof and an image-side being concave at a paraxial region thereof, wherein the object-side surface of the fifth lens element changes from convex at the paraxial region thereof to concave at a peripheral region thereof, and the object-side surface and the image-side surface of the fifth lens element are aspheric;
wherein an effective radius of the object-side surface of the fifth lens element is Y51, an effective radius of the object-side surface of the first lens element is Y11, and the following relationship is satisfied:

$0.7 < |Y51/Y11| < 1.2.$

14. The imaging lens assembly of claim 13, wherein the fourth lens element has an object-side surface being concave at a paraxial region thereof, and an image-side surface being convex at a paraxial region thereof.

15. The imaging lens assembly of claim 14, wherein the object-side surface of the first lens element changes from concave at the paraxial region thereof to convex at a peripheral region thereof.

16. The imaging lens assembly of claim 14, wherein a minimum distance between an optical axis and a non-axial critical point on the object-side surface of the fifth lens element is Yc51, a distance in parallel with the optical axis from the non-axial critical point on the object-side surface of the fifth lens element to an axial vertex on the object-side surface of the fifth lens element is SAGc51, SAGc51/Yc51 is a tangent value of an angle α, and the following relationship is satisfied:

$0.10 < \tan \alpha < 0.60.$

17. The imaging lens assembly of claim 14, wherein a minimum distance between an optical axis and a non-axial critical point on the object-side surface of the fifth lens element is Yc51, the effective radius of the object-side surface of the fifth lens element is Y51, and the following relationship is satisfied:

$0.7 < |Yc51/Y51| < 0.95.$

18. The imaging lens assembly of claim 14, wherein a curvature radius of the object-side surface of the first lens element is R1, a focal length of the first lens element is f1, and the following relationship is satisfied:

$0 < R1/f1 < 2.0.$

19. The aging lens assembly of claim 14, wherein a curvature radius of an image-side surface of the third lens element is R6, a curvature radius of the object-side surface of the fourth lens element is R7, and the following relationship is satisfied:

$0.2 < R7/R6 < 0.8$.

20. The imaging lens assembly of claim 14, wherein a focal length of the imaging lens assembly is f, a focal length of the third lens element is f3, and the following relationship is satisfied:

$0.80 < f/f3 < 1.70$.

21. The imaging lens assembly of claim 20, wherein an Abbe number of the third lens element is V3, an Abbe number of the fourth lens element is V4, and the following relationship is satisfied:

$26.0 < V3 - V4 < 52.0$.

22. The imaging lens assembly of claim 20, wherein a maximal field of view of the imaging lens assembly is FOV, and the following relationship is satisfied:

80 degrees $< FOV <$ 120 degrees.

23. The imaging lens assembly of claim 13, wherein an axial distance between the object-side surface of the first lens element and the image-side surface of the fifth lens element is Td, and the following relationship is satisfied:

$2.1 \text{ mm} < Td < 3.6 \text{ mm}$.

24. An imaging lens assembly comprising, in order from an object side to an image side:
  a first lens element with negative refractive power having an object-side surface being concave at a paraxial region thereof, wherein the object-side surface of the first lens element changes from concave at the paraxial region thereof to convex at a peripheral region thereof, and the object-side surface and an image-side surface of the first lens element are aspheric;
  a second lens element with refractive power;
  a third lens element with positive refractive power;
  a fourth lens element with negative refractive power; and
  a fifth lens element with positive refractive power having an object-side surface being convex at a paraxial region thereof and an image-side surface being concave at a paraxial region thereof, wherein the object-side surface of the fifth lens element changes from convex at the paraxial region thereof to concave at a peripheral region thereof, and the object-side surface and the image-side surface of the fifth lens element are aspheric;
  wherein a curvature radius of the object-side surface of the first lens element is R1, a focal length of the first lens element is f1, and the following relationship is satisfied:

$0 < R1/f1 < 2.0$.

25. The imaging lens assembly of claim 24, wherein the fourth lens element has an object-side surface being concave at a paraxial region thereof, and an image-side surface being convex at a paraxial region thereof.

26. The imaging lens assembly of claim 25, wherein an effective radius of the object-side surface of the fifth lens element is Y51, an effective radius of the object-side surface of the first lens element is Y11, and the following relationship is satisfied:

$0.7 < |Y51/Y11| < 1.2$.

27. The imaging lens assembly of claim 25, wherein a curvature radius of the object-side surface of the fourth lens element is R7, a curvature radius of the image-side surface of the fourth lens element is R8, and the following relationship is satisfied:

$-0.80 < (R7-R8)/(R7+R8) < 0$.

28. The imaging lens assembly of claim 25, wherein a curvature radius of an image-side surface of the third lens element is R6, a curvature radius of the object-side surface of the fourth lens element is R7, and the following relationship is satisfied:

$0.2 < R7/R6 < 0.8$.

* * * * *